(12) United States Patent
Favor

(10) Patent No.: US 6,237,083 B1
(45) Date of Patent: May 22, 2001

(54) MICROPROCESSOR INCLUDING MULTIPLE REGISTER FILES MAPPED TO THE SAME LOGICAL STORAGE AND INHIBITING SYCHRONIZATION BETWEEN THE REGISTER FILES RESPONSIVE TO INCLUSION OF AN INSTRUCTION IN AN INSTRUCTION SEQUENCE

(75) Inventor: John G. Favor, Scotts Valley, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/110,518

(22) Filed: Jul. 6, 1998

Related U.S. Application Data

(63) Continuation-in-part of application No. 09/120,275, filed on Feb. 13, 1998, now abandoned.

(51) Int. Cl.[7] .................................................... G06F 9/312
(52) U.S. Cl. .......................... 712/217; 711/141; 711/147
(58) Field of Search ..................................... 711/141, 147; 712/217

(56) References Cited

U.S. PATENT DOCUMENTS

| | | | |
|---|---|---|---|
| 4,597,044 | 6/1986 | Circello | 713/100 |
| 4,803,622 | 2/1989 | Bain, Jr. et al. | 710/5 |
| 5,530,817 | 6/1996 | Masubuchi . | |
| 5,530,889 | 6/1996 | Kametani | 712/247 |
| 5,574,939 | 11/1996 | Keckler et al. | 712/24 |
| 5,604,912 | 2/1997 | Iadonato et al. | 712/23 |
| 5,649,174 | 7/1997 | Dockser | 713/501 |
| 5,889,975 | 3/1999 | Meyer et al. | 712/219 |
| 5,892,963 | 4/1999 | Iadonato et al. | 712/23 |
| 5,940,859 * | 8/1999 | Bistry et al. | 711/147 |
| 5,941,984 | 8/1999 | Mohri et al. | 712/218 |
| 5,956,747 * | 9/1999 | Wilhelm et al. | 711/140 |

FOREIGN PATENT DOCUMENTS

| | | |
|---|---|---|
| 0 594 240 | 4/1994 | (EP) . |
| 97/22924 | 6/1997 | (WO) . |

OTHER PUBLICATIONS

MMX Tecnology Application Notes, "New EMMS Usage Guidelines", Intel Corporation, 1998, pp. 1–2.
MMX Technology, John Pawasauskas, "CS563–Advanced topics in Computer Graphics", Copyright 1997, pp. 1–10.

(List continued on next page.)

*Primary Examiner*—Kenneth S. Kim
(74) *Attorney, Agent, or Firm*—Conley, Rose & Tayon, PC; Lawrence J. Merkel

(57) ABSTRACT

A microprocessor includes a first register file including a plurality of multimedia registers defined to store operands for multimedia instructions and a second register file including a plurality of floating point registers defined to store operands for floating point instructions. The multimedia registers and floating point registers are mapped to the same logical storage according to the instruction set employed by the microprocessor. In order to maintain predefined behavior when a floating point instruction reads a register most recently updated by a multimedia instruction or vice versa, the microprocessor provides for synchronization of the first and second register files between executing a set of one or more multimedia instructions and a set of one or more floating point instructions (where either set may be prior to the other in program order and the order affects which direction copying of the contents is performed, i.e. first register file to second register file or vice versa). The predefined behavior in the above mentioned circumstances is thereby maintained. The microprocessor supports an empty state instruction. If the empty state instruction is included between the set of one or more multimedia instructions and the set of one or more floating point instructions in a code sequence, the microprocessor inhibits the register file synchronization. In one embodiment including the x86 instruction set, the empty state instruction performs the same set of actions as the EMMS instruction in addition to the above mentioned features.

56 Claims, 10 Drawing Sheets

OTHER PUBLICATIONS

MMX Technology Programmers Reference Manual, "Application Programming Model", Chpt 3, Intel Corporation, 1998, pp. 1–5.

MMX Technology Programmers Reference Manual, "Intel Architecture MMX™ Instruction Set ", Chpt. 5, Intel Corporation, 1998, pp. 1–34.

Intel Architecture Software Developer's Manual, vol. 1, Basic Architecture, Chpt. 8, "Programming with the Intel MMX™ Technology", 1997, pp. 8–1 to 8–15.

Intel Architecture Software Developer's Manual, vol. 2, Instruction Set Reference, "EMMS–Empty MMX™ State", 1997, pp 3–87.

* cited by examiner

MICROPROCESSOR INCLUDING MULTIPLE REGISTER FILES MAPPED TO THE SAME LOGICAL STORAGE AND INHIBITING SYCHRONIZATION BETWEEN THE REGISTER FILES RESPONSIVE TO INCLUSION OF AN INSTRUCTION IN AN INSTRUCTION SEQUENCE

CROSS REFERENCE TO RELATED APPLICATIONS

This application is a continuation-in-part of application Ser. No. 09/120,275 filed Feb. 13, 1998, by Favor, entitled "Fast Empty State Instruction for a Microprocessor Including Multiple Register Files Mapped to the Same Logical Storage" now abandoned.

BACKGROUND OF THE INVENTION

1. Field of the Invention

This invention is related to the field of microprocessors and, more particularly, to microprocessors having multiple register files which map to the same logical storage.

2. Description of the Related Art

Microprocessors are often configured to operate upon a variety of data types in order to provide computational solutions to a wide range of problems. For example, integer and floating point data types are common. The integer data type may be used in the case where the values to be operated upon are of approximately the same magnitude (as well as any intermediate results calculated in order to produce the results of interest). On the other hand, if the magnitudes of the values to be operated upon (or the intermediate results) are expected to vary widely, then the floating point data type may be more appropriate. It is noted that, as used herein, the terms "floating point data type", "floating point register", and "floating point instruction" refer to operation upon floating point operands according to IEEE standard 754/854 floating point arithmetic. For example, the x87 instructions defined by Intel Corporation are floating point instructions.

The data type used by each instruction within the instruction set is typically predefined as part of the instruction definition. For example, integer instructions are instructions which are defined to operate upon the integer data type. Similarly, floating point instructions are defined to operate upon the floating point data type. Generally, an instruction is the most basic operation which the programmer can specify in order to direct the microprocessor to perform a desired function. By arranging instructions in a particular order, the programmer may accomplish a specific objective. Instructions may be grouped with other instructions to form different instruction types according to the data type upon which they are defined to operate. Typically, an instruction is defined to receive one or more operands upon which to perform an operation (the "source operands") and is defined to store the result (the "destination operand"). The term "instruction set", as used herein, refers to a group of instructions defined via a particular processor architecture. Each instruction is assigned a unique encoding which identifies that instruction unambiguously from other instructions within the instruction set.

As advances in semiconductor fabrication processes have been developed, it has become possible to increase the number of transistors which can be included upon a single chip and to increase the operating frequencies of the chips. Accordingly, microprocessors have been able to increase performance through increased operating frequencies (i.e. shorter clock cycles) as well as through advanced microarchitectures made possible by the increase in available transistors.

One way to take advantage of the increase in available transistors is to add new data types to the microprocessor. The new data types may be specifically designed with a particular task in mind. The data type, and the instructions defined to operate upon the data type, may be optimized for the particular task. For example, the x86 instruction set has recently been expanded in this fashion. While previous microprocessors which implement the x86 instruction set (e.g. the 80486 from Intel Corporation and the $5_K86$ from Advanced Micro Devices, Inc.) generally execute instructions specifying the floating point and integer data types, the most recent microprocessor implementations also execute instructions specifying the MMX data type. The MMX data type is a 64 bit operand treated as a set of packed integers. The packed integers may be eight 8 bit integers, four 16 bit integers, or two 32 bit integers. Even more recently, a packed floating point operand has been added for additional multimedia computation capabilities. The packed floating point operand may comprise, for example, two packed 32-bit floating point values within the 64 bit operand. However, the packed floating point operands may not be entirely IEEE 754 compatible. Together, the MMX data type and the packed floating point data type may be referred to herein as a multimedia data type. Other data formats may be included in the multimedia data type as well.

The multimedia data type and instructions which use the data type are optimized for video, graphics, and audio data manipulations. Audio, graphics, and/or video manipulation is referred to herein as "multimedia manipulation". These types of operations have become more important as computer systems have employed more advanced graphical user interfaces via the operating systems and application programs installed thereon. Additionally, the audio capabilities of computer systems have been enhanced. More particularly, the multimedia data type allows for the same operation to be performed upon each of the values within the packed operand (i.e. a single instruction, multiple data (SIMD) implementation). By employing the SIMD operations, fewer instructions may be employed to perform the desired manipulations then would have otherwise been required (since one instruction may concurrently operate upon multiple values). For many video, graphics, and/or audio computing tasks, the same operation is applied to a large number of data elements arranged for display or playback, and therefore instructions which perform the same operation upon multiple data elements may be advantageous.

In order to minimize the impact upon operating systems designed for the x86 architecture prior to the addition of the multimedia data type and instructions, the registers defined to store the multimedia operands are defined to be shared with the x87 floating point registers (i.e. the registers defined to store IEEE 754/854 compliant floating point operands). In other words, the multimedia registers are architecturally defined to use the same logical storage locations as the x87 floating point registers. In this manner, no new state is added to the microprocessor. If new state were added to the microprocessor, the operating system software would require change. More particularly, the portion of the operating system responsible for context switching would require changes to save and restore the new state. Due to the sharing of logical storage between x87 floating point registers and multimedia registers, operating systems which do not recognize multimedia instructions may still operate properly (particularly with respect to context save and restore operations). Since these operating systems were already handling the floating point registers, the multimedia registers are automatically handled.

It is noted that the multimedia registers may store packed floating point operands. However, these floating point operands differ from the x87 floating point operands in a number of ways. For example, the x87 floating point operand is a single 80 bit extended precision value occupying the x87 floating point register, while the packed floating point operands may be a pair of 32 bit single precision values occupying the corresponding multimedia register. Furthermore, different instructions within the instruction set are defined to access the x87 floating point registers than the instructions defined to access the multimedia registers. Additionally, the x87 floating point registers are operated in a stack-oriented fashion by the x87 floating point instructions, while the multimedia registers are accessed as individual registers by the multimedia instructions.

The sharing of registers between data types may be advantageous for operating system compatibility (particularly the context save/restore portion of the operating system, as described above), but creates additional hardware problems for microprocessors supporting the new data type and instructions. While it is generally illogical to store a value of one data type in a shared register and then use the shared register as a source operand for an instruction operating upon a different data type, it is desirable to provide defined behavior in such situations. In order to maintain compatibility with software written using the new data types, it is desirable to maintain this defined behavior when designing microprocessors which implement the architecture. It is also desirable to maintain this behavior with a minimal impact upon the performance of the microprocessors.

SUMMARY OF THE INVENTION

The problems outlined above are in large part solved by a microprocessor in accordance with the present invention. The microprocessor includes a first register file including a plurality of multimedia registers defined to store operands for multimedia instructions and a second register file including a plurality of floating point registers defined to store operands for x87 floating point instructions. The multimedia registers and floating point registers are mapped to the same logical storage according to the instruction set employed by the microprocessor. In order to maintain predefined behavior when a floating point instruction reads a register most recently updated by a multimedia instruction or vice versa, the microprocessor provides for synchronization of the first and second register files between executing a set of one or more multimedia instructions and a set of one or more floating point instructions (where either set may be prior to the other in program order and the order affects which direction copying of the contents is performed, i.e. first register file to second register file or vice versa). Advantageously, synchronization of the register files is automatically performed, transparent to software. The predefined behavior in the above mentioned circumstances is thereby maintained.

In order to support higher performance in cases for which the predefined behavior is not needed, the microprocessor supports a "fast empty state" instruction (or FEMMS instruction). The FEMMS instruction may also be referred to herein as the empty state instruction. If the FEMMS instruction is included between the set of one or more multimedia instructions and the set of one or more floating point instructions in a code sequence, the microprocessor inhibits the register file synchronization. Since the register file synchronization is not performed, the delay associated with the synchronization is circumvented. Advantageously, more efficient code execution may be realized. In one embodiment including the x86 instruction set, the FEMMS instruction performs the same set of actions as the EMMS instruction in addition to the above mentioned features. By providing register file synchronization and the FEMMS instruction, compatibility with software expecting the predefined behavior is maintained while allowing software not needing the predefined behavior the flexibility to not have the register file synchronization.

Broadly speaking, the present invention contemplates a microprocessor comprising a decode unit, a first register file, a second register file, a first execution unit, and a second execution unit. The decode unit is configured to decode instructions defined within an instruction set including a first type of instructions, a second type of instructions, and an empty state instruction. Additionally, the instruction set defines that a first plurality of registers accessible via the first type of instructions and a second plurality of registers accessible via the second type of instructions are mapped onto a logical storage in which each of the first plurality of registers is assigned to a logical storage location to which a corresponding one of the second plurality of registers is assigned. The first register file includes physical storage locations corresponding to the first plurality of registers. Similarly, the second register file includes physical storage locations corresponding to the second plurality of registers. Coupled to the first register file, the first execution unit is configured to execute instructions of the first type. Additionally, the first execution unit is configured to read operands for the instructions of the first type from the first register file. Similarly, the second execution unit is coupled to the second register file and is configured to execute instructions of the second type. The second execution unit is configured to read operands for the instructions of the second type from the second register file. The microprocessor is configured to inhibit a synchronization of the first register file and the second register file between an execution of the first instruction and an execution of the second instruction upon decoding a first instruction sequence including a first instruction of the first type, the empty state instruction, and the second instruction of the second type.

The present invention further contemplates a method for executing instructions defined within an instruction set including a first type of instructions, a second type of instructions, and an empty state instruction. The instruction set further defines that a first plurality of registers accessible via the first type of instructions and a second plurality of registers accessible via the second type of instructions are mapped onto a logical storage in which each of the first plurality of registers is assigned to a logical storage location to which a corresponding one of the second plurality of registers is assigned. A first operand for a first instruction of the first type is read from a first register file including physical storage locations for each of the first plurality of registers. A second operand for a second instruction of the second type is read from a second register file including physical storage locations for each of the second plurality of registers. The first register file and the second register file are synchronized between reading the first operand and reading the second operand if the empty state instruction is not included between the first instruction and the second instruction in an instruction sequence. A synchronization of the first register file and the second register file is inhibited if the empty state instruction is included between the first instruction and the second instruction in the instruction sequence.

Moreover, the present invention contemplates a microprocessor comprising a first register file and a second register. The first register file includes physical storage locations corresponding to a first plurality of registers. Similarly, the second register file includes physical storage locations corresponding to a second plurality of registers. The microprocessor is configured to execute instructions defined within an instruction set including a first type of instructions, a second type of instructions, and an empty state instruction, wherein the instruction set further defines that a first plurality of registers accessible via the first type of instructions and a second plurality of registers accessible via the second type of instructions are mapped onto a logical storage in which each of the first plurality of registers is assigned to a logical storage location to which a corresponding one of the second plurality of registers is assigned. Additionally, the microprocessor is configured to inhibit a synchronization of the first register file and the second register file subsequent to executing a first instruction of the first type and prior to executing a second instruction of the second type responsive to a first instruction sequence which: (i) includes the first instruction and the second instruction; and (ii) also includes the empty state instruction.

The present invention still further contemplates a computer system, comprising a microprocessor, a memory, and an I/O device. The microprocessor includes a first register file including physical storage locations corresponding to a first plurality of registers and a second register file including physical storage locations corresponding to a second plurality of registers. The microprocessor is configured to execute instructions defined within an instruction set including a first type of instructions, a second type of instructions, and an empty state instruction, wherein the instruction set further defines that a first plurality of registers accessible via the first type of instructions and a second plurality of registers accessible via the second type of instructions are mapped onto a logical storage in which each of the first plurality of registers is assigned to a logical storage location to which a corresponding one of the second plurality of registers is assigned. Furthermore, the microprocessor is configured to inhibit a synchronization of the first register file and the second register file subsequent to executing a first instruction of the first type and prior to executing a second instruction of the second type responsive to an instruction sequence including the first instruction and the second instruction also including the empty state instruction. Coupled to the microprocessor, the main memory is configured to store the instruction sequence and to provide the instruction sequence to the microprocessor upon request therefrom for the instruction sequence. Coupled to the main memory, the I/O device is configured to transfer data between the main memory and a second computer system coupled to the I/O device.

BRIEF DESCRIPTION OF THE DRAWINGS

Other objects and advantages of the invention will become apparent upon reading the following detailed description and upon reference to the accompanying drawings in which.

Figure 1:
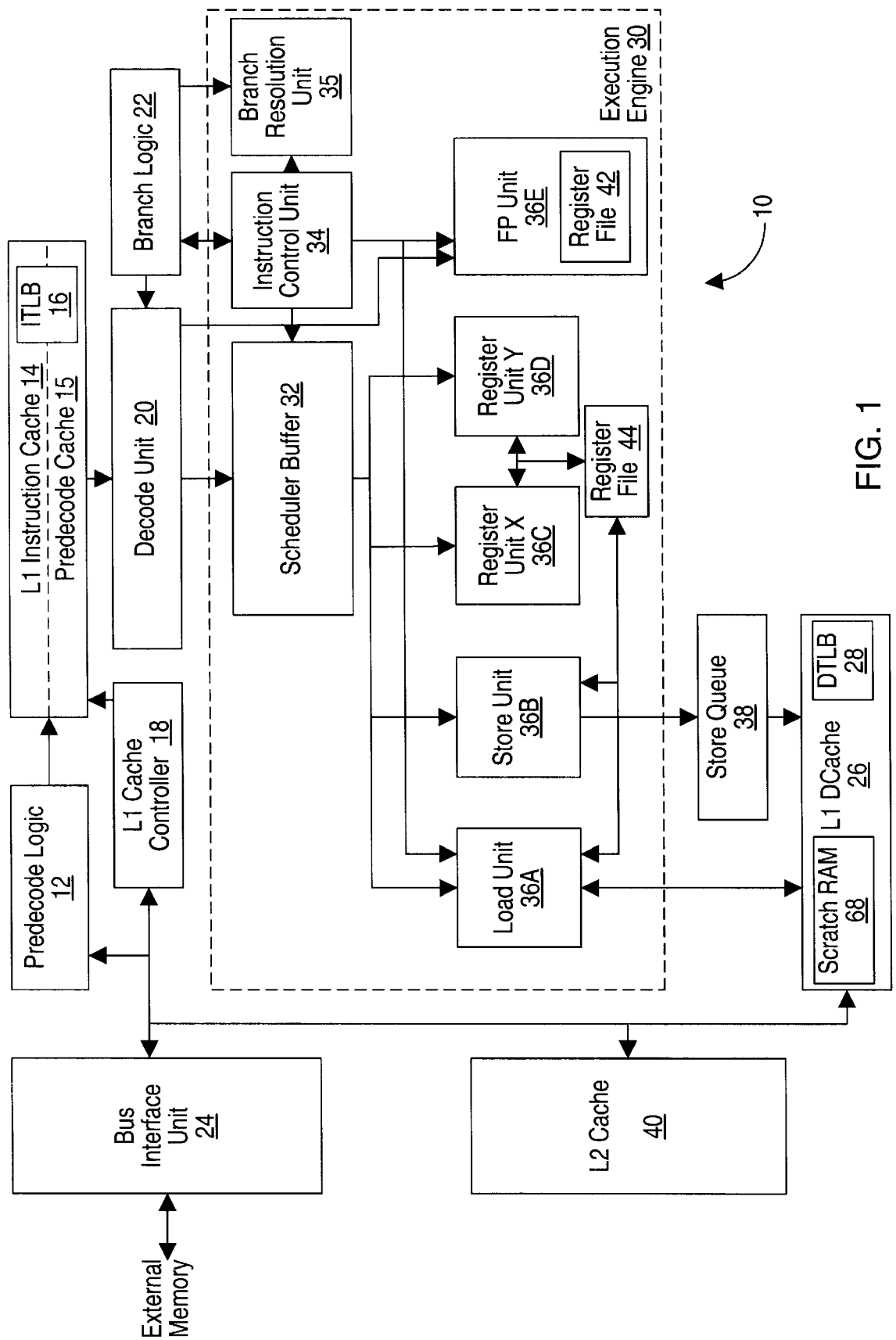
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Other embodiments are possible and contemplated. In the embodiment of FIG. 1, microprocessor 10 includes a predecode logic block 12 coupled to an instruction cache 14 and a predecode cache 15. Caches 14 and 15 also include an instruction TLB 16. A cache controller 18 is coupled to predecode logic block 12, instruction cache 14, and predecode cache 15. Controller 18 is additionally coupled to a bus interface unit 24, a level-one data cache 26 (which includes a data TLB 28 and a scratch RAM 68), and an L2 cache 40. Microprocessor 10 further includes a decode unit 20, which receives instructions from instruction cache 14 and predecode data from predecode cache 15. This information is forwarded to execution engine 30 in accordance with input received from a branch logic unit 22.

Execution engine 30 includes a scheduler buffer 32 coupled to receive input from decode unit 20. Scheduler buffer 32 is coupled to convey decoded instructions to a plurality of execution units 36A–36E in accordance with input received from instruction control unit 34. Execution units 36A–36E include a load unit 36A, a store unit 36B, and register X unit 36C, and register Y unit 36D, and a floating point unit 36E. Load unit 36A receives input from data cache 26, while store unit 36B interfaces the data cache 26 via a store queue 38. Elements referred to herein with a reference number followed by a letter will be collectively referred to by the reference number alone. For example, execution units 36A–36E will be collectively referred to as execution units 36.

As shown in FIG. 1, load unit 36A, store unit 36B, and register units 36C–36D are coupled to a register file 44, from which these units are configured to read source operands and to which load unit 36A and register units 36C–36D are configured to store destination result values. Floating point unit 36E is also shown as including a register file 42. Register file 42 includes physical storage locations assigned to each of the architected floating point registers. Register file 44 includes physical storage locations assigned to each of the architected multimedia registers (which are defined to map onto corresponding architected floating point registers). Floating point instructions (e.g. x87 floating point instructions, or IEEE 754/854 compliant floating point instructions) are executed by floating point unit 36E, which reads source operands from register file 42 and updates destinations within register file 42 as well. Register units 36C–36D execute integer instructions, reading source operands from register file 44 and updating destinations within register file 44. However, the integer registers are logically separate (i.e. architecturally defined to be separate storage locations) from the floating point registers. Additionally, register units 36C–36D are configured to execute multimedia instructions, which in the present embodiment are defined to read source operands from multimedia registers which are logically the same storage locations as the floating point registers. Therefore, the physical storage locations corresponding to multimedia registers within register file 44 are logically the same as the physical storage locations within register file 42. As used herein, the term multimedia instruction refers to the above described packed integer operations (e.g. operations such as those defined by the MMX instructions within the x86 instruction set). Furthermore, the term multimedia instructions may refer to packed floating point operations optimized for three dimensional graphics calculations and/or physics calculations. These instructions may be defined to operate, for example, on two 32-bit floating point numbers packed into a given multimedia register. Other packed floating point formats may be used as well.

Because separate sets of physical storage locations within register files 42 and 44 are mapped to one set of logical storage locations (i.e. the architected floating point registers), microprocessor 10 supports synchronization of register files 42 and 44 in order to allow predictable behavior when: (i) a floating point instruction uses a register as a source operand, and the most recent update to the register was performed in response to a multimedia instruction; and (ii) a multimedia instruction uses a register as a source operand, and the most recent update to the register was performed in response to a floating point instruction. However, the register file synchronization is a relatively slow process. Generally, synchronizing register files 42 and 44 involves copying the contents of each physical storage location within one of the register files which represents a register logically shared between multimedia instructions and floating point instructions into the other register file. The direction of the copy (i.e. from register file 42 to register file 44 or from register file 44 to register file 42) depends upon which type of instructions (floating point or multimedia) have recently been executed. As used herein, the term "logical storage location" refers to a storage location (e.g. a register) which is architecturally defined to exist. In other words, the instruction set definition defines the storage location, and instructions can specify the storage location as an operand via various encodings of the instruction. On the other hand, a "physical storage location" refers to a storage location actually implemented by microprocessor 10. A logical storage location is "mapped" to a particular physical storage location if an instruction coded to access the logical storage location results in an access to the particular physical storage location.

As mentioned above, synchronizing register files 42 and 44 is a relatively slow A process. Accordingly, synchronizing register files 42 and 44 may unduly limit the performance of microprocessor 10. As noted previously, it is generally illogical for a floating point instruction to use multimedia results as a source operand, and vice versa. Microprocessor 10 defines an FEMMS instruction which can be used to indicate that a particular instruction sequence is not relying on synchronization between multimedia register updates and floating point register updates. If the FEMMS instruction is used in an instruction sequence, microprocessor 10 inhibits the synchronization of register files 42 and 44. In this fashion, code sequences which do not require synchronization may be executed more rapidly by microprocessor 10, and therefore may achieve a higher performance level than would otherwise be possible.

In one embodiment, microprocessor 10 employs the x86 instruction set and the FEMMS instruction performs the operations defined for the EMMS instruction in addition to inhibiting register file synchronization. More particularly, the tag word register in the floating point unit 36E is updated upon execution of the FEMMS instruction to indicate that each of the floating point registers is not valid. The FEMMS instruction is encoded differently than the EMMS instruction, and microprocessor 10 is configured to execute the EMMS instruction as well. The EMMS instruction, however, has no effect on whether or not register files 42 and 44 are synchronized. In other words, if the EMMS instruction is executed and the FEMMS instruction is not executed, register files 42 and 44 are synchronized. In one particular embodiment, an encoding of 0F 0E (hexadecimal) is assigned to the FEMMS instruction (as opposed to the encoding 0F 77 for the EMMS instruction) and the instruction mnemonic is FEMMS.

It is noted that microprocessor 10 may employ register renaming with respect to register files 42 and 44, such that a particular physical location within register file 42 is not permanently assigned to a given logical floating point register (and similarly a particular physical location within register file 44 is not permanently assigned to a given logical multimedia register). However, prior to the execution of any particular instruction, a set of physical locations within each register file does correspond to the logical registers. Accordingly, register file synchronization is still performed even in the presence of register renaming. It is further noted that, while the above discussion refers to floating point and multimedia instructions as having register source operands and destinations, these instructions are not precluded from having memory operands (i.e. operands read from and stored to memory locations directly as opposed to using registers). Still further, while multimedia and floating point instruction types are described herein as having shared register sets, it is contemplated that other types of instructions may be similarly configured, and that the FEMMS instruction may be used in such embodiments.

In one embodiment, instruction cache 14 is organized as sectors, with each sector including two 32 byte cache lines. The two cache lines of a sector share a common tag and have separate state bits that track the status of the line. Accordingly, two forms of cache misses (and associated cache fills) may take place: sector replacement and cache line replacement. In the case of sector replacement, the miss is due to a tag mismatch in instruction cache 14, with the required cache line being supplied by external memory via bus interface 24. The cache line within the sector that is not needed is then marked invalid. The required cache line is supplied by external memory, but, unlike the sector replacement case, the cache line within the sector that was not requested remains in the same state. In alternate embodiments, other organizations for instruction cache 14 may be utilized, as well as various replacement policies.

Microprocessor 10 performs prefetching only in the case of sector replacements, in one embodiment. During sector replacement, the required cache line is filled. If this required cache line is in the first half of the sector, the other cache line in the sector is prefetched. If this required cache line is in the second half of the sector, no prefetching is performed. It is noted that other prefetching methodologies may be employed in different embodiments of microprocessor 10.

When cache lines of instruction data are retrieved from external memory by bus interface unit 24, the data is conveyed to predecode logic block 12. In one embodiment, the instructions processed by microprocessor 10 and stored in cache 14 are variable length (e.g. the x86 instruction set). Because decode of variable length instructions is particularly complex, predecode logic block 12 is configured to provide additional information to be stored in predecode cache 15 to aid during decode. In one embodiment, predecode logic block 12 generates predecode bits for each byte stored in instruction cache 14. The predecode bits indicate the number of bytes to the start of the next variable length instruction. These predecode bits are stored in predecode cache 15 are passed to decode unit 20 when instruction bytes are requested from cache 14.

Instruction cache 14 may be implemented as a 32 Kbyte, two way set associative cache. The cache line size may be 32 bytes, for example. Cache 14 also includes a TLB 16 used to translate linear addresses to physical addresses. TLB 16 may comprise, for example, 64 entries.

Instruction fetch addresses are supplied by cache controller 18 to instruction cache 14. In one embodiment, up to 16 bytes per clock cycle may be fetched from cache 14. The corresponding predecode information is fetched from predecode cache 15 in parallel. The fetched information is placed into an instruction buffer within decode unit 20. In one embodiment of microprocessor 10, fetching may occur long a single execution stream with up to seven outstanding branches taken.

Decode unit 20 is configured to decode multiple instructions per processor clock cycle. In one embodiment, decode unit 20 accepts instruction bytes and predecode bits from the instruction buffer (in x86 format), locates instruction boundaries, and generates corresponding "RISC ops". RISC ops are fixed format internal instructions, most of which are executable by microprocessor 10 in a single clock cycle. RISC ops are combined to form every function of the x86 instruction set.

Instruction control unit 34 contains the logic necessary to manage out of order execution of instructions stored in scheduler buffer 32. Instruction control unit 34 also manages data forwarding, register renaming, simultaneous issue and retirement of RISC ops, and speculative execution. In one embodiment, scheduler buffer 32 holds up to 24 RISC ops at one time, equating to a maximum of 12 x86 instructions. When possible, instruction control unit 34 may simultaneously issue (from buffer 32) a RISC op to any available one of execution units 36. In one embodiment, instruction control unit 34 may issue up to 6, and retire up to four, RISC ops per clock cycle.

As shown in FIG. 1, microprocessor 10 includes five execution units 36. Store unit 36B and load unit 36A are two staged pipeline designs. Store unit 36A performs data memory writes which are available for loading after one clock cycle. Load unit 36A performs memory reads. The data from these reads is available after two clock cycles. Load and store units are possible in other embodiments with varying latencies.

Execution unit 36C is a fixed point (or integer) execution unit which is configured to operate on ALU operations, multiplication, division (both signed and unsigned), shifts, and rotates. In contrast, execution unit 36D is a fixed point execution unit which is configured to operate on basic word and double word ALU operations (e.g. add, and, compare, etc.).

Execution units 36C–36D are also configured to accelerate performance of software written using multimedia instructions. Applications that can take advantage of multimedia instructions include graphics, video and audio compression and decompression, speech recognition, telephony, and certain physics algorithms.

Execution unit 36E contains an IEEE 754/854 compliant floating point unit designed to accelerate the performance of software which utilizes the x86 (or x87) floating point instructions. Execution unit 36E may include an adder unit, a multiplier unit, and a divide/square root unit. Execution unit 36E may operate in a coprocessor style fashion, in which decode unit 20 directly dispatches the floating point instructions to execute unit 36E. The floating point instructions are still allocated in scheduler buffer 32 to allow for in order retirement of instructions. Execution unit 36E and scheduler buffer 32 communicate to determine when a floating point instruction is ready for retirement.

Branch resolution unit 35 is separate from the branch prediction logic 22 in that it resolves conditional branches after the branch conditions been evaluated. Branch resolution unit 35 allows efficient speculative execution, enabling microprocessor 10 to execute instructions beyond conditional branches before knowing whether the branch prediction was correct. As described above, microprocessor 10 is configured to handle up to seven outstanding branches in one embodiment.

Branch prediction logic 22, coupled to decode unit 20, is configured to increase the accuracy with which conditional branches are predicted in microprocessor 10. Branch prediction logic 22 is configured to handle branch behavior and its negative effects on instruction execution, such as stalls due to delayed instruction fetching. In one embodiment, branch prediction logic 22 includes an 8192 entry branch history table, a 16 entry by 16 byte branch target cache, and a 16 entry return address stack.

Branch prediction logic 22 implements a two level adaptive history algorithm using the branch history table. This table stores executed branch information, predicts individual branches, and predicts behavior of groups of branches. In one embodiment, the branch history table does not store predicted target addresses in order to save space. These addresses are instead calculated on the fly during the decode stage. To avoid a clock cycle penalty for a cache fetch when a branch is predicted taken, a branch target cache within branch logic 22 supplies the first 16 bytes at the target address directly to the instruction buffer (if a hit occurs in the branch target cache).

Branch logic 22 also includes circuitry designed to optimize the call and return instructions. This circuitry allows the address of the next instruction following the call instruction in memory to be pushed onto a return address stack. When microprocessor 10 encounters a return instruction, branch logic 22 pops the address from the return stack and begins fetching at that address.

Like instruction cache 14, data cache 26 is also organized as a two way set associative, 32 Kbyte cache according to the present embodiment. Data TLB 28 is used to translate linear to physical addresses, and may include, for example, 128 entries. Data cache 26 may be sectored similar to instruction cache 14. Data cache 26 further includes scratch RAM 68, which is used by microcode routines stored in a microcode ROM within decode unit 20. The microcode routines may use scratch RAM 68 to temporarily store values used only within the routines. Additionally, scratch RAM 68 may be used to store state used by the microcode routines (e.g. a floating point/multimedia state described below). Microcode routines may include load instructions executed through load unit 36A to access values stored in scratch RAM 68, and may include store instructions executed through store unit 36B to update values stored in scratch RAM 68. Scratch RAM 68 may be integrated into data cache 26 as shown in FIG. 1, or may be separate memory accessible to load unit 36A and store unit 36B. Alternatively, scratch RAM 68 may be implemented as a set of special registers accessible to microcode instructions. Generally, scratch RAM 68 is microcode accessible state.

Figure 2:
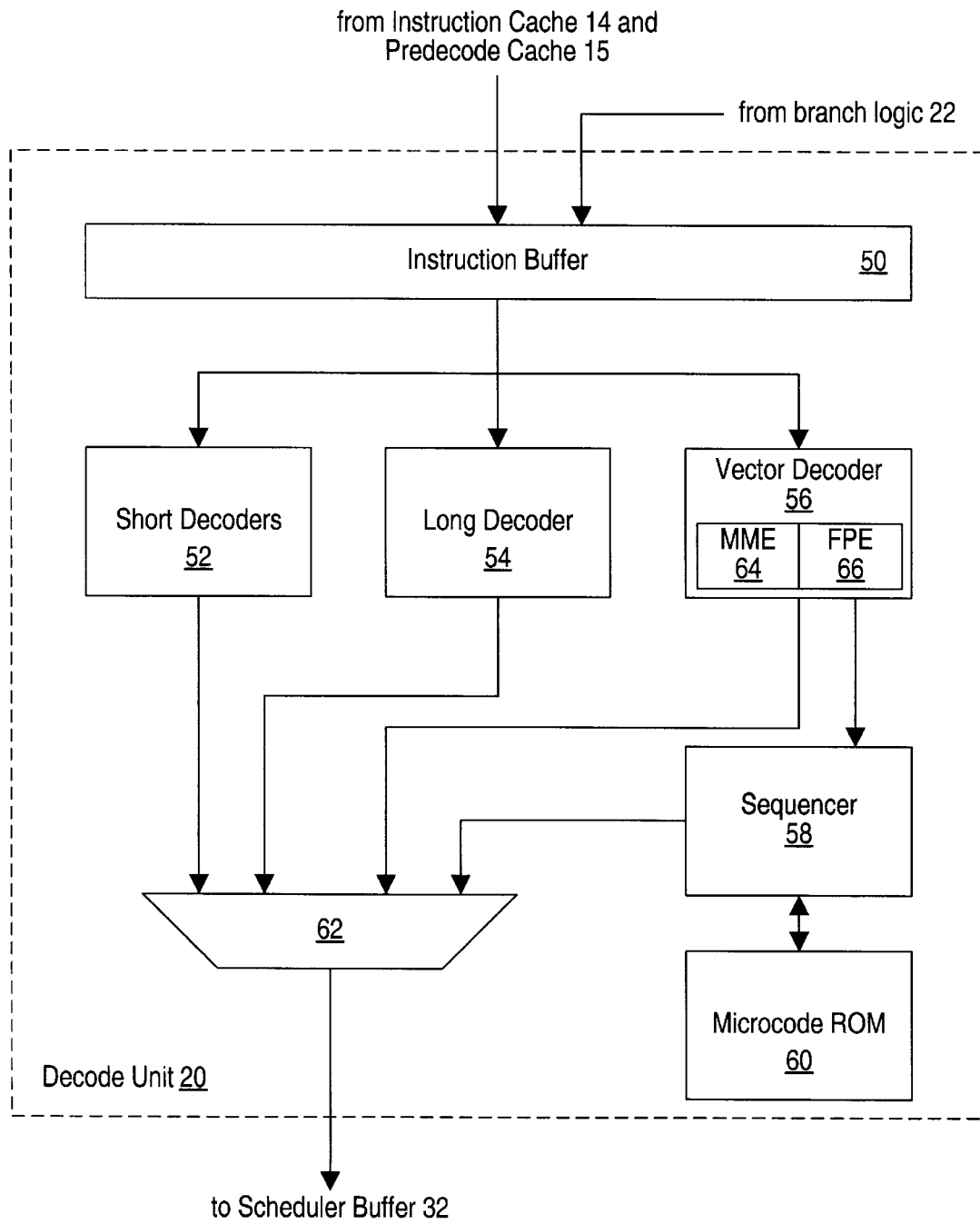
FIG. 2 is a block diagram of one embodiment of a decode unit shown in FIG. 1.

Turning next to FIG. 2, a block diagram of one embodiment of decode unit 20 is shown. Other embodiments are possible and contemplated. In the embodiment shown in FIG. 2, decode unit 20 includes an instruction buffer 50, a set of short decoders 52, a long decoder 54, a vector decoder 56, a sequencer 58, a microcode ROM 60, and an output select multiplexor (mux) 62. Instruction buffer 50 is coupled to receive instruction bytes and corresponding predecode data from instruction cache 14 and predecode cache 15 or from branch logic unit 22 in the event that a branch is predicted taken. Instruction buffer 50 is also coupled to short decoders 52, long decoder 54, and vector decoder 56. Each of short decoders 52, long decoder 54, vector decoder 56, and sequencer 58 are coupled to provide inputs to output select mux 62. Vector decoder 56 is also coupled to sequencer 58 which is further coupled to microcode ROM 60. Output select mux 62 is coupled scheduler buffer 32. Vector decoder 56 includes a pair storage locations 64 and 66. Storage location 64 stores a multimedia enable indication, while storage location 66 stores a floating point enable indication.

Instruction buffer 50 is configured to store the instruction bytes and corresponding predecode data until the bytes are decoded and dispatched by one of decoders 52, 54 and 56. Each clock cycle, instruction buffer 50 discards the instruction bytes which have been decoded and merges the remaining instruction bytes with instruction bytes received from instruction cache 14/predecode cache 15 or branch logic unit 22. In one embodiment, instruction buffer 50 stores up to 16 instruction bytes and corresponding predecode data.

Short decoders 52 translate the most commonly used x86 instructions (e.g. moves, shifts, branches, etc.) into zero, one or two RISC ops each. Short decoders 52 are configured to operate upon "short" x86 instructions. In other words, short decoders 52 are configured to decode instructions having a number of bytes up to a predefined maximum length. In one embodiment, the predefined maximum length is seven bytes. In one embodiment, short decoders 52 comprises two parallel decoders.

Long decoder 54 decodes one instruction per clock cycle and generates up to four RISC ops in response to the instruction. The decoder 54 is configured to decode an instruction which is longer than the predefined maximum length supported by short decoders 52, but can still be decomposed into no more than four RISC ops. In one embodiment, long decoder 54 is configured to decode instructions up to 1 bytes in length.

Vector decoder 56 decodes the remaining instructions not handled by short decoders 52 or long decoder 54. Vector decoder 56 is configured to generate the first four RISC ops of a microcode routine corresponding to the instruction being decoded. In parallel, vector decoder 56 is configured generate an entry point (i.e. an address within microcode ROM 60) at which the remainder of the routine is stored. Sequencer 58 fetches the remainder of the routine from microcode ROM 60 during subsequent clock cycles, and transmits the routine, up to four RISC ops at a time, to output select mux 62.

In addition to handling those instructions for which short decoders 52 and long decoder 54 are not designed, vector decoder 56 detects certain boundary conditions in the executed instruction sequence. In response to a particular boundary condition, vector decoder 56 generates the initial RISC ops of the corresponding microcode routine which handles the particular boundary condition and an entry point into microcode ROM 60 of the remainder of the corresponding microcode routine. Among the boundary conditions detected by vector decoder 56 are: (i) a multimedia instruction subsequent to decoding floating point instructions but prior to decoding any other multimedia instructions; (ii) a floating point instruction subsequent to decoding multimedia instructions but prior to decoding any other floating point instructions, or (iii) an FEMMS instructions (for changing the floating point/multimedia state stored in scratch RAM 68, as described below). In each these cases, a synchronization of register files 42 and 44 may be needed. Vector decoder 56 may further detect exception conditions and generate initial RISC ops and entry points therefor.

Vector decoder 56 detects the above mentioned multimedia/floating point boundary conditions (and generates appropriate RISC ops and entry points therefor) using the multimedia enable and floating point enable indications stored in storage locations 64 and 66. Each indication may comprise a bit indicative, when set, that decode of the corresponding instruction type is enabled and indicative, when clear, that decode of the corresponding instruction type is disabled. Alternatively, each indication may comprise a bit indicative when set, that decode of the corresponding instruction type is disabled and indicative, when clear, that decode of the corresponding instruction type is enabled. Only one of the instruction types represented by the multimedia enable and the floating point enable indications may be enabled at any given time. Upon decode of an instruction type which is disabled, vector decoder 56 detects a corresponding potential boundary condition. Furthermore, decoding an FEMMS instruction is a detection of a boundary condition (although the result may be only to change the floating point/multimedia state described below).

Sequencer 58 fetches one of several microcode routines according to the entry point generated (as described above). The microcode routines determine if a register file synchronization between register files 42 and 44 is to be performed and selectively perform that synchronization. Furthermore, the microcode routines perform certain other synchronizations between execution units 36C–36D and execution unit 36E. For example, in embodiments of microprocessor 10 which employ x86 architecture including the multimedia instructions described above, the tag word used by floating point execution unit 36E to indicate the validity of the floating point registers and the top of stack portion of the status word are modified in response to execution of multimedia instructions. Accordingly, the tag word and top of stack value are synchronized as well.

The microcode routines handling the floating point/multimedia boundary conditions manipulate a floating point/multimedia state within scratch RAM 68. The floating point/multimedia state indicates whether or not floating point instruction execution or multimedia instruction execution is active, similar to the multimedia enable and floating point enable indications maintained by vector decoder 56. Additionally, however, the floating point/multimedia state also indicates if the FEMMS instruction was the most recently executed instruction from the group of floating point instructions, multimedia instructions, and the FEMMS instruction. The microcode routines corresponding to the FEMMS instruction set the floating point/multimedia state to indicate that the most recently executed multimedia instruction was an FEMMS instruction. The floating point/multimedia state then indicates that the most recently executed instruction was an FEMMS instruction until either a floating point or a multimedia instruction is subsequently executed. Upon executing a subsequent floating point instruction, a register file synchronization would be inhibited. Furthermore, the floating point/multimedia state would be updated to indicate that floating point instruction execution is active. On the other hand, executing a subsequent multimedia instruction would cause the state to indicate multimedia instruction execution is active (i.e. that the most recently executed instruction from the group of floating point instructions, multimedia instructions, and the FEMMS instruction was a multimedia instruction and hence was not the FEMMS instruction). The floating point/multimedia state will be described in more detail below with respect to FIG. 3.

In the above described fashion, the enable indications allow decode unit 20 to detect boundaries between a set of one or more floating point instructions and a set of one or more multimedia instructions, even if a variety of the other instruction types are decoded therebetween (e.g. integer instructions). The floating point/multimedia state allows the microcode routines executed upon detecting a boundary to determine if a register file synchronization is needed. It is noted that, in some cases, decode of neither instruction type may be enabled. For example, floating point instruction execution may be disabled via a control bit in a control register defined by the architecture employed by microprocessor 10. For example, in the x86 architecture, an EM bit in the CR0 register is defined to disable floating point instruction execution. In such a case, floating point instruction decode is disabled (even if multimedia instruction decode is disabled). Microcode then initiates the appropriate exception processing.

It is noted that the microcode routines are responsible for keeping the state of the floating point and multimedia enables stored in locations 64 and 66 consistent with the floating point/multimedia state stored in scratch RAM 68 and for ensuring that updates of these enables are performed prior to decoding any subsequent instructions. A variety of well known methods may be used to ensure the updates (e.g. performing a synchronizing operation, performing the update early enough in the routine that the update would be retired prior to dispatch of the end of the routine, etc.).

Output select mux 62 is configured to select instructions from one of the sources providing instructions thereto and to transmit those instructions to scheduler buffer 32. Each of the sources of instructions provides RISC ops to output select mux 62, and hence scheduler buffer 32 only receives RISC ops. Output select mux 62 is controlled by control signals (not shown in the drawing for clarity) from each of the decoders and sequencer 58.

It is noted that instructions from instruction buffer 50 are provided to each of decoders 52, 54, and 56 in parallel. Each of the decoders attempts to decode the instruction bytes provided, and a decoder which is actually able to decode the instruction(s) causes output select mux 62 to select its output. It is further noted that microcode ROM 60, in addition to storing the routines described above for register file synchronization (or the lack thereof), stores routines for various other purposes, as desired. A microcode routine comprises a sequence of instructions (e.g. RISC ops) which are arranged to accomplish a particular objective.

Figure 3:
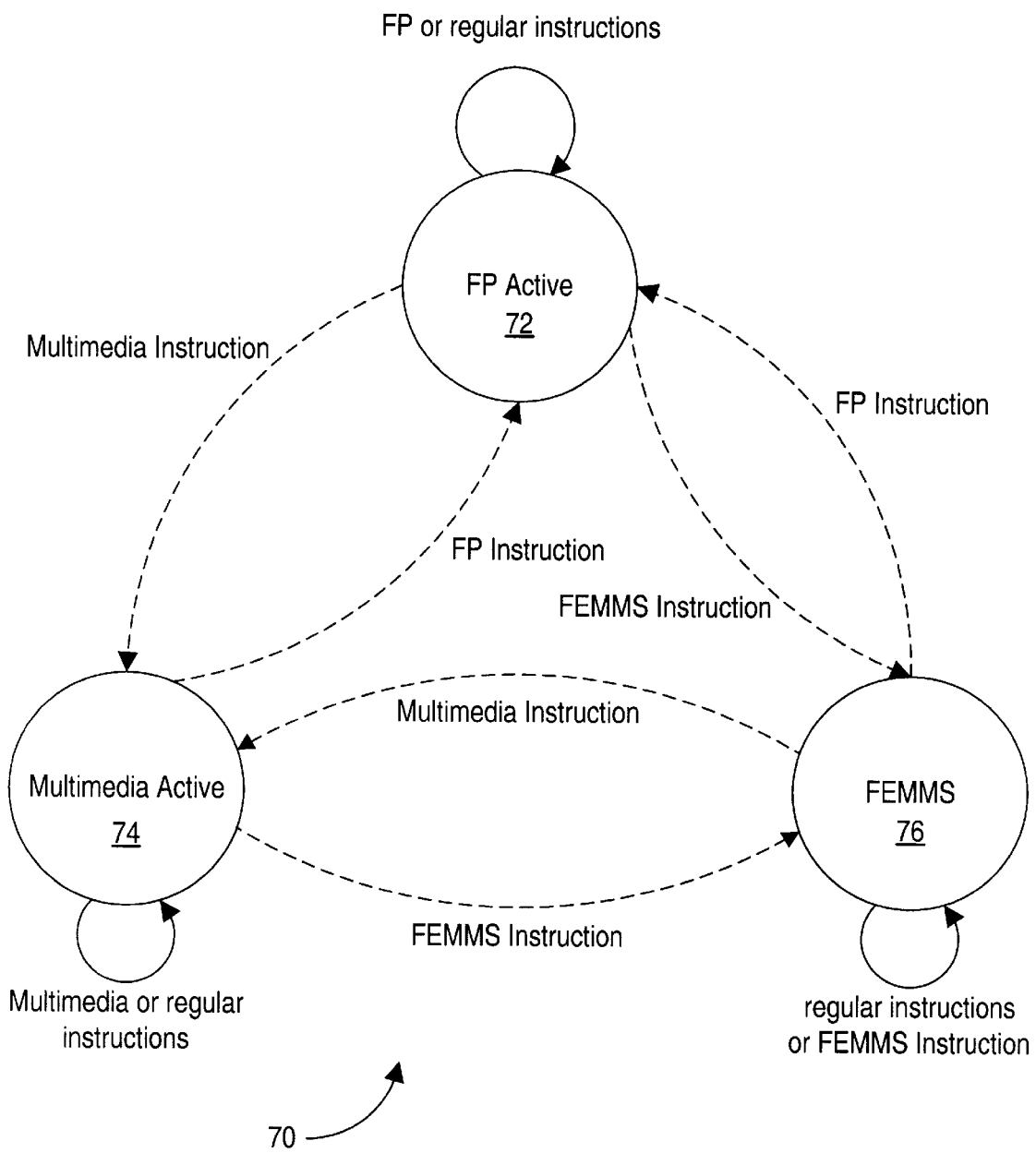
FIG. 3 is a state machine diagram illustrating operation of one embodiment of a decode unit shown in FIG. 2.

Turning next to FIG. 3, an exemplary state machine 70 illustrating the states of one embodiment of the floating point/multimedia state maintained by sequencer 58 is shown. Other embodiments are possible and contemplated. In the embodiment of FIG. 3, state machine 70 includes an FP active state 72, a multimedia active state 74, and an FEMMS state 76.

FP active state 72 is the state in which floating point instructions may be decoded and dispatched without detection of a boundary condition to determine if a register file synchronization is to be performed. Hence, the floating point enable indication in vector decoder 56 may be in the enabled state when state machine 70 is in FP active state 72. In either of multimedia active state 74 or FEMMS state 76, multimedia instructions may be decoded and dispatched without detection of a boundary condition to determine if a register file synchronization is to be performed. Hence, the multimedia enable indication in vector decoder 56 may be in the enabled state when state machine 70 is in multimedia active state 74 or FEMMS state 76. As will be described below, there may be cases in which the floating point enable indication is not enabled while state machine 70 is in FP active state 72 and in which the multimedia enable indication is not enabled while the state machine is in multimedia active state 74 or FEMMS state 76. The various arcs illustrated upon state machine 70 indicate the events which cause state changes to occur. A dashed arc indicates a boundary condition signalled by vector decoder 56 in order determine if a register file synchronization is to be performed and/or to change the state of state machine 70.

When state machine 70 is in FP active state 72, execution of either floating point or "regular" instructions cause state machine 70 to remain in FP active state 72. For purposes of this discussion, "regular" instructions refer to instructions which are not floating point, multimedia, or FEMMS instructions. For example, integer instructions are regular instructions in this discussion. On the other hand, execution of a multimedia instruction or an FEMMS instruction causes a state transition from FP active state 72 to one of multimedia active state 74 or FEMMS state 76, respectively. A transition from FP active state 72 to multimedia active state 74 incurs a register file synchronization, while a transition from FP active state 72 to FEMMS state 76 does not incur a register file synchronization. In this manner, a transition from executing floating point instructions to executing multimedia instructions can be initiated with an FEMMS instruction, and the register file synchronization may be inhibited. Upon completion of the microcode routine corresponding to the particular state transition, state machine 70 is in the destination state.

When state machine 70 is in multimedia active state 74, execution of either multimedia or regular instructions causes state machine 70 to remain in multimedia state 74. On the other hand, execution of an FEMMS instruction causes state machine 70 to transition to FEMMS state 76. Execution of a floating point instruction causes a transition to FP active state 72. The transition to FEMMS state 76 occurs without a register file synchronization. Conversely, the transition to FP active state 72 occurs with a register file synchronization.

When state machine 70 is in FEMMS state 76, execution of regular instructions or an FEMMS instruction causes state machine 70 to remain in FEMMS state 76. In this manner, one or more regular instructions can be inserted in a code sequence between the FEMMS instruction and a subsequent multimedia instruction or floating point instruction and the effects upon register file synchronization due to the existence of the FEMMS instruction within the code sequence are the same as if the regular instructions were not in the code sequence. Accordingly, the programming model for use of the FEMMS instruction may be more flexible. On the other hand, execution of a multimedia instruction causes state machine 70 transition to multimedia active state 74 (without a register file synchronization). Execution of a floating point instruction causes a transition to FP active state 72. The transition from FEMMS state 76 to FP active state 72 is also accomplished without a register file synchronization.

It is noted that, while the above description indicates which of the state machine transitions incur a register file synchronization and which do not, those state machine transitions are managed via microcode routines in the present embodiment. Accordingly, it is the microcode routines that determine, during execution of a state transition, whether or not a register file synchronization is performed. In the present embodiment, the floating point/multimedia state is stored in scratch RAM 68 and the microcode routines may read scratch RAM 68 (via a load instruction) to access the current state and may update scratch RAM 68 (via a store instruction) to change the current state to a new state. As mentioned above, when changing states, the microcode routines are responsible for establishing a consistent state in storages 64 and 66 used by vector decoder 56.

FIGS. 4A–4E, in combination, illustrate the operation of decode unit 20 and the microcode routines used to perform state changes and selectively perform register file synchronizations according to one embodiment of processor 10. Other embodiments are possible and contemplated. For example, the division of responsibilities between decode unit 20 hardware and microcode routines may be varied. In the present embodiment, decode unit 20 hardware decodes and dispatches (without microcode intervention): (i) floating point instructions if the floating point enable indication indicates enabled, and (ii) multimedia instructions if the multimedia enable indication indicates enabled. Additionally, decode unit 20 generates entry points for microcode routines for the following cases: (i) decoding a floating point instruction and the floating point enable indication indicates disabled; (ii) decoding a multimedia instruction and the multimedia enable indication indicates disabled; (iii) decoding an FEMMS instruction and the multimedia indication indicates disabled; and (iv) decoding an FEMMS instruction and the multimedia indication indicates enabled. The floating point enable indication and the multimedia enable indication refer to the values stored in storages 66 and 64 (in FIG. 2), respectively.

Figure 4A:
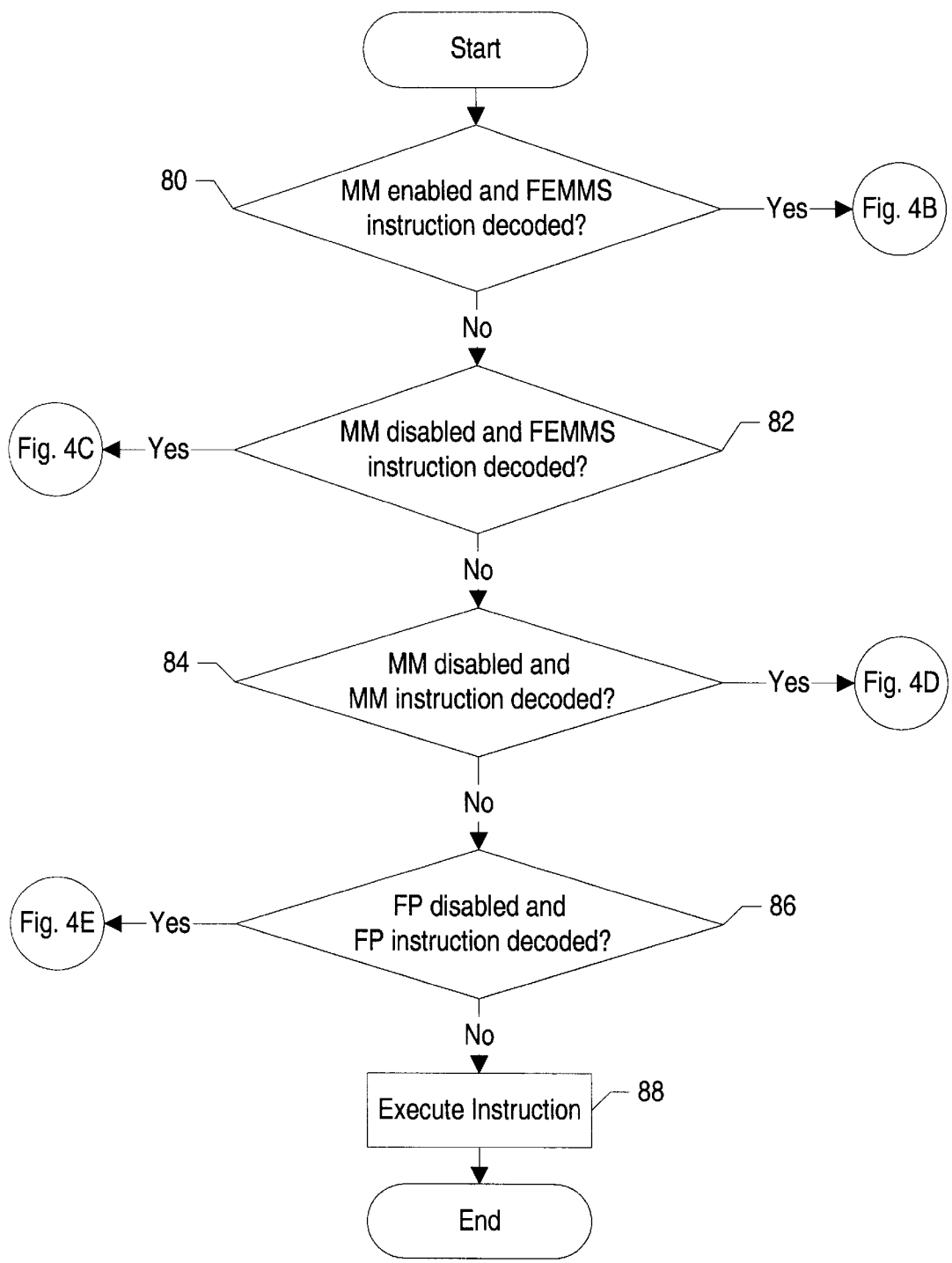
FIG. 4A is a flowchart illustrating steps performed by one embodiment of the decode unit shown in FIG. 2 upon decoding an instruction.

Turning next to FIG. 4A, a flowchart is shown illustrating an exemplary set of actions performed, upon decode of an instruction, by one embodiment of decode unit 20. Other embodiments are possible and contemplated. While the steps shown in FIG. 4A (and FIGS. 4B–4E shown below) are in some cases illustrated in serial order, any suitable order may be used. For the remainder of this discussion, the term microcode routine will be used. It is understood, however, that one or more microcode routines may be used as desired. Furthermore, the steps shown in the following flowcharts may be performed in parallel as desired. The steps may still further be performed in parallel upon multiple concurrently decoded instructions, if desired.

Figure 4B:
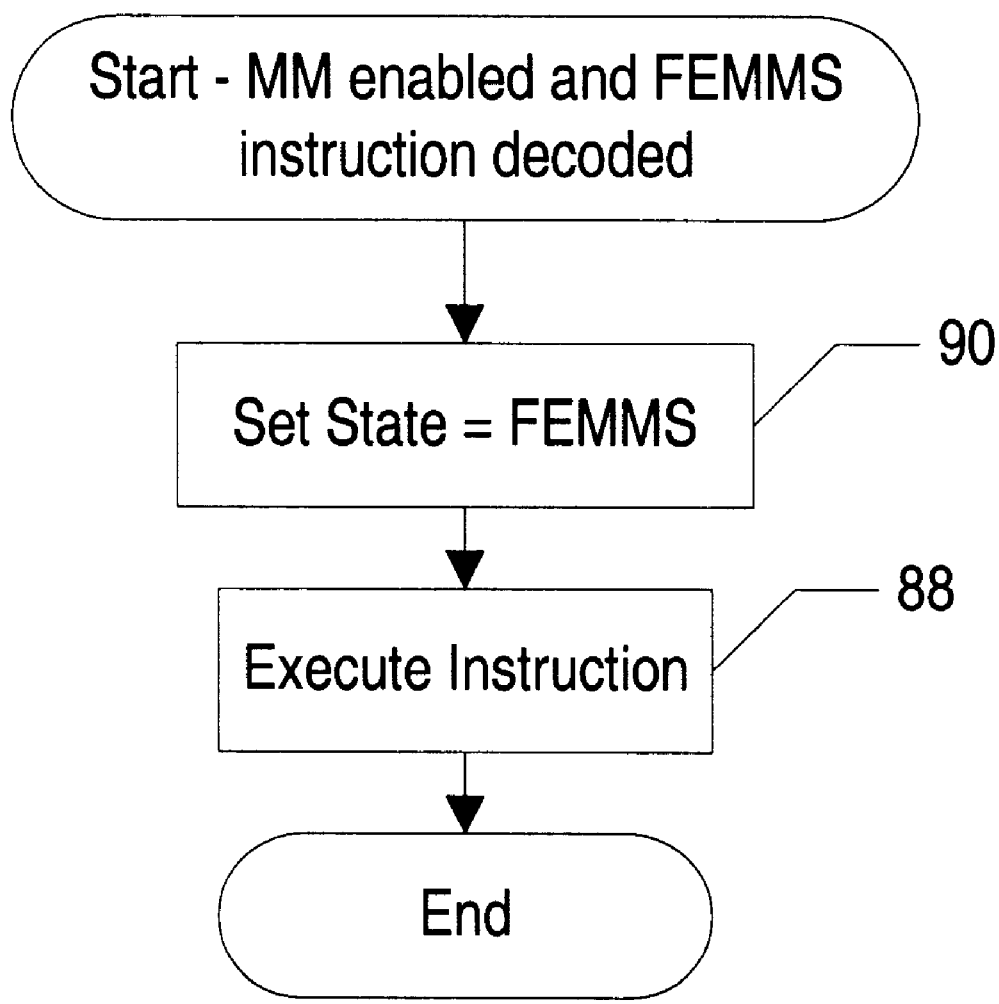
FIG. 4B is a flowchart illustrating steps performed in a microcode sequence upon detecting an FEMMS instruction with multimedia instructions enabled.

Decode unit 20 generates a first entry point into microcode ROM 60 if the multimedia enable indication indicates enabled and an FEMMS instruction is decoded (decision block 80). The actions performed by the selected microcode routine are illustrated in FIG. 4B below. Similarly, a second entry point is generated if the multimedia enable indication indicates disabled and an FEMMS instruction is decoded (decision block 82, actions performed by the selected microcode routine illustrated in FIG. 4C). A third entry point is generated if the multimedia enable indication indicates disabled and a multimedia instruction is decoded (decision block 84, actions performed by the selected microcode routine illustrated in FIG. 4D). A fourth entry point is generated if the floating point enable indication indicates disabled and a floating point instruction is decoded (decision block 86, actions performed by the selected microcode routine illustrated in FIG. 4E). Otherwise, decode unit 20 dispatches the instruction for execution (step 88). It is noted that executing the instruction according to step 88 may involve a microcode routine other than the routines used to manage state machine 70 and selective register file synchronization between register files 42 and 44. It is further noted that dispatching instructions for instruction execution includes the following cases: (i) the floating point enable indication indicates enabled and a floating point instruction is decode; and (ii) the multimedia enable indication indicates enabled and a multimedia instruction is decoded.

Turning now to FIG. 4B, a flowchart is shown illustrating the microcode routine executed upon decoding an FEMMS instruction while the multimedia enable indication indicates enabled. The microcode routine updates the floating point/ multimedia state stored in scratch RAM 68 to the FEMMS state (step 90) and the FEMMS instruction is executed (step 88). Executing the FEMMS instruction includes updating the multimedia version of the tag word (maintained in register file 44 or microcode accessible state) to the "all registers empty" encoding. It is noted that the microcode routine illustrated in FIG. 4B updates the floating point/ multimedia state to the FEMMS state even if the floating point/multimedia state is already in FEMMS state. In this manner, the microcode routine need not check the current state before updating the state.

Figure 4C:
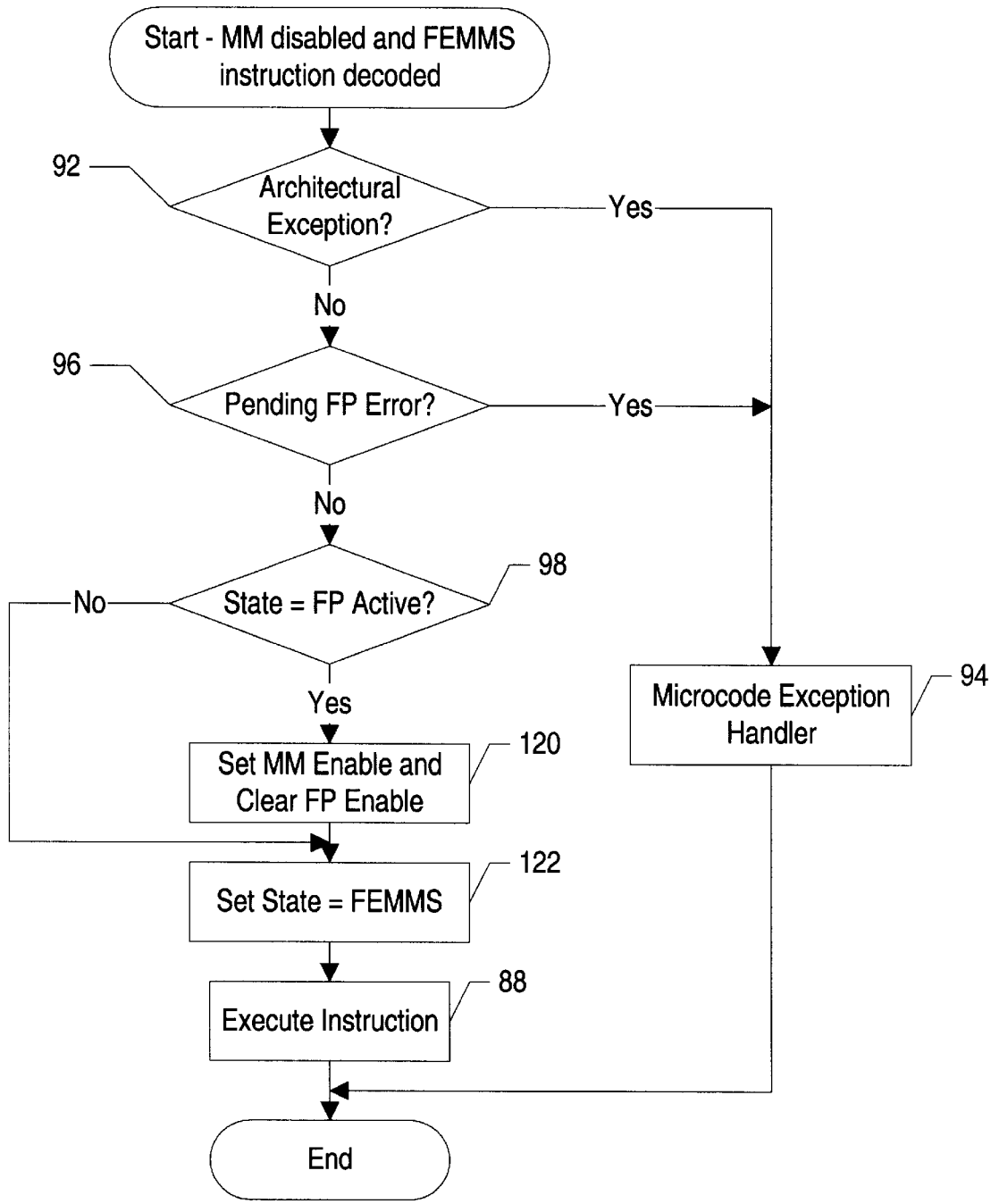
FIG. 4C is a flowchart illustrating steps performed in a microcode sequence upon detecting an FEMMS instruction with multimedia instructions disabled.

Turning next to FIG. 4C, a flowchart is shown illustrating the microcode routine executed upon decoding an FEMMS instruction while the multimedia enable indication indicates disabled. The microcode routine determines if an architectural exception is to be taken in response to the instruction (decision block 92). For example, the state of the EM and TS bits in CR0 as defined in the x86 microprocessor architecture may dictate that an architectural exception is to be taken. If an architectural exception is to be taken, then the microcode routine passes control to a microcode exception handler (step 94). If an architectural exception is not to be taken, then the microcode routine determines if there is a pending floating point error which is not being ignored (decision block 96). Microprocessor 10 includes a facility for the computer system to indicate to microprocessor 10 that a floating point error is to be ignored (e.g. a pin upon which an ignore signal may be asserted). The indication may be removed at any time. If there is a non-ignored pending floating point error, then the microcode exception handler is invoked (step 94).

The microcode routine reads the current floating point/ multimedia state from scratch RAM 68 if control is not passed to the microcode exception handler. The microcode routine determines if the current state is FP active (decision block 98). If the state is not FP active (and the multimedia indication indicates disabled, which is the case if the routine illustrated in FIG. 4C is executed), then a currently-ignored pending floating point error may be occurring. Accordingly, so that an exception is taken when the ignore indication is removed by the system, the microcode routine does not update the multimedia enable and floating point enable indications. On the other hand, if the current floating point/ multimedia state is FP active, the microcode routine updates the multimedia indication to indicate enabled and the floating point enable indication to disabled (step 120).

The microcode routine additionally updates the floating point/multimedia state to the FEMMS state (step 122) and executes the FEMMS instruction (step 88). Since the routine illustrated in FIG. 4C is entered upon detection of an FEMMS instruction, a register file synchronization is not performed even if the floating point/multimedia state was FP active prior to execution of the FEMMS instruction.

Figure 4D:
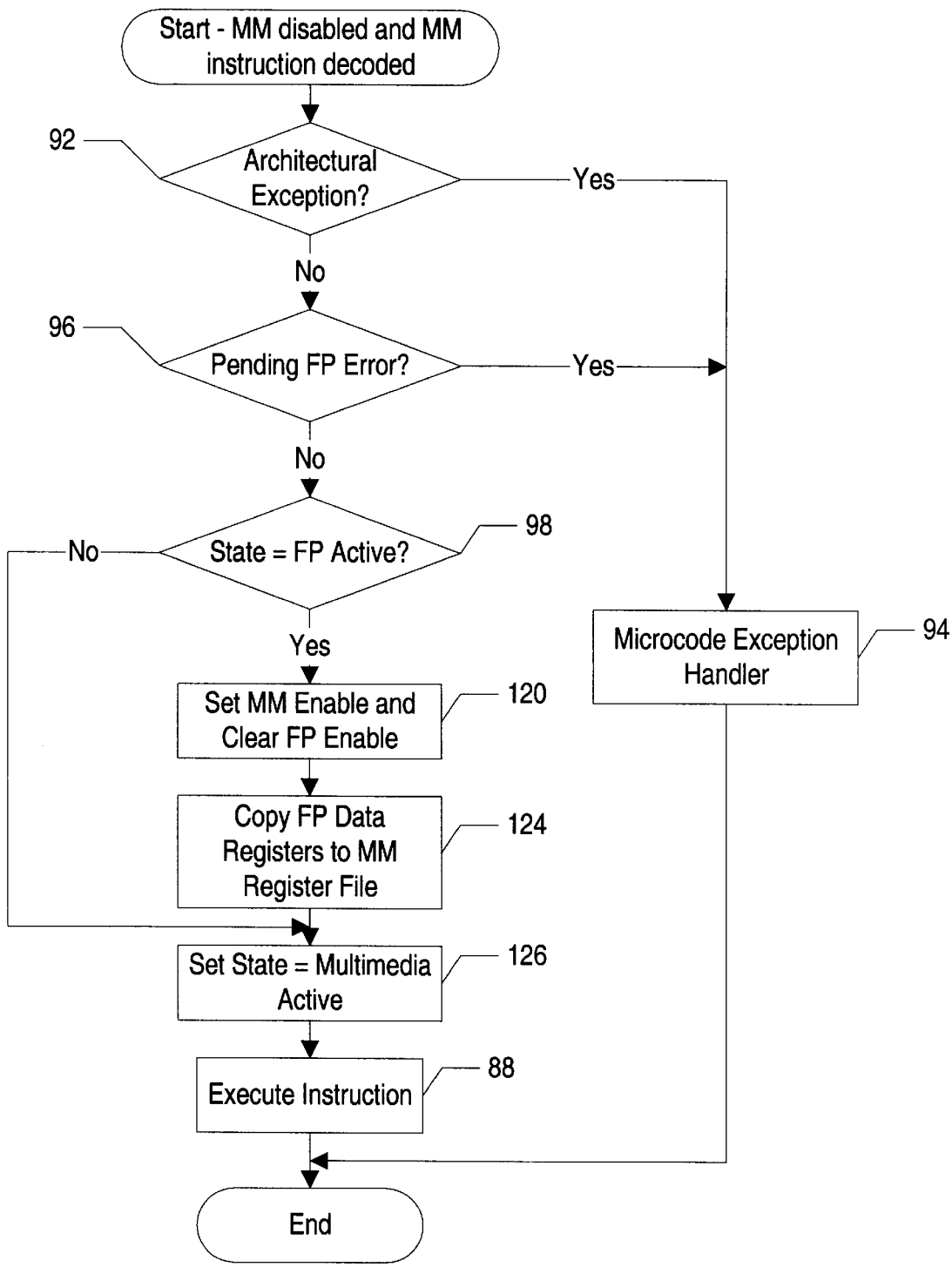
FIG. 4D is a flowchart illustrating steps performed in a microcode sequence upon detecting a multimedia instruction with multimedia instructions disabled.

Turning next to FIG. 4D, a flowchart is shown illustrating the microcode routine executed upon decoding a multimedia instruction while the multimedia enable indication indicates disabled. Similar to the routine shown in FIG. 4C, the microcode routine determines if an architectural exception or a non-ignored pending floating point error exception is to be taken in response to the instruction (decision blocks 92 and 96) and the microcode routine passes control to a microcode exception handler (step 94) if an architectural exception or floating point error exception is to be taken.

The microcode routine reads the current floating point/ multimedia state from scratch RAM 68 if control is not passed to the microcode exception handler. The microcode routine determines if the current state is FP active (decision block 98). If the state is not FP active (and the multimedia indication indicates disabled, which is the case if the routine illustrated in FIG. 4D is executed), then a currently-ignored pending floating point error may be occurring. Accordingly, so that an exception is taken when the ignore indication is removed by the system, the microcode routine does not update the multimedia enable and floating point enable indications. Additionally, a register file synchronization is not performed if the current state is not FP active (since the current state is either multimedia or FEMMS). On the other hand, if the current floating point/multimedia state is FP active, the microcode routine updates the multimedia indication to indicate enabled and the floating point enable indication to disabled (step 120). Additionally, a register file synchronization is performed. In other words, the value stored in each of the floating point data registers from register file 42 is copied into the corresponding multimedia data register in register file 44 (step 124).

The microcode routine additionally updates the floating point/multimedia state to the multimedia active state (step 126) and executes the multimedia instruction (step 88).

Figure 4E:
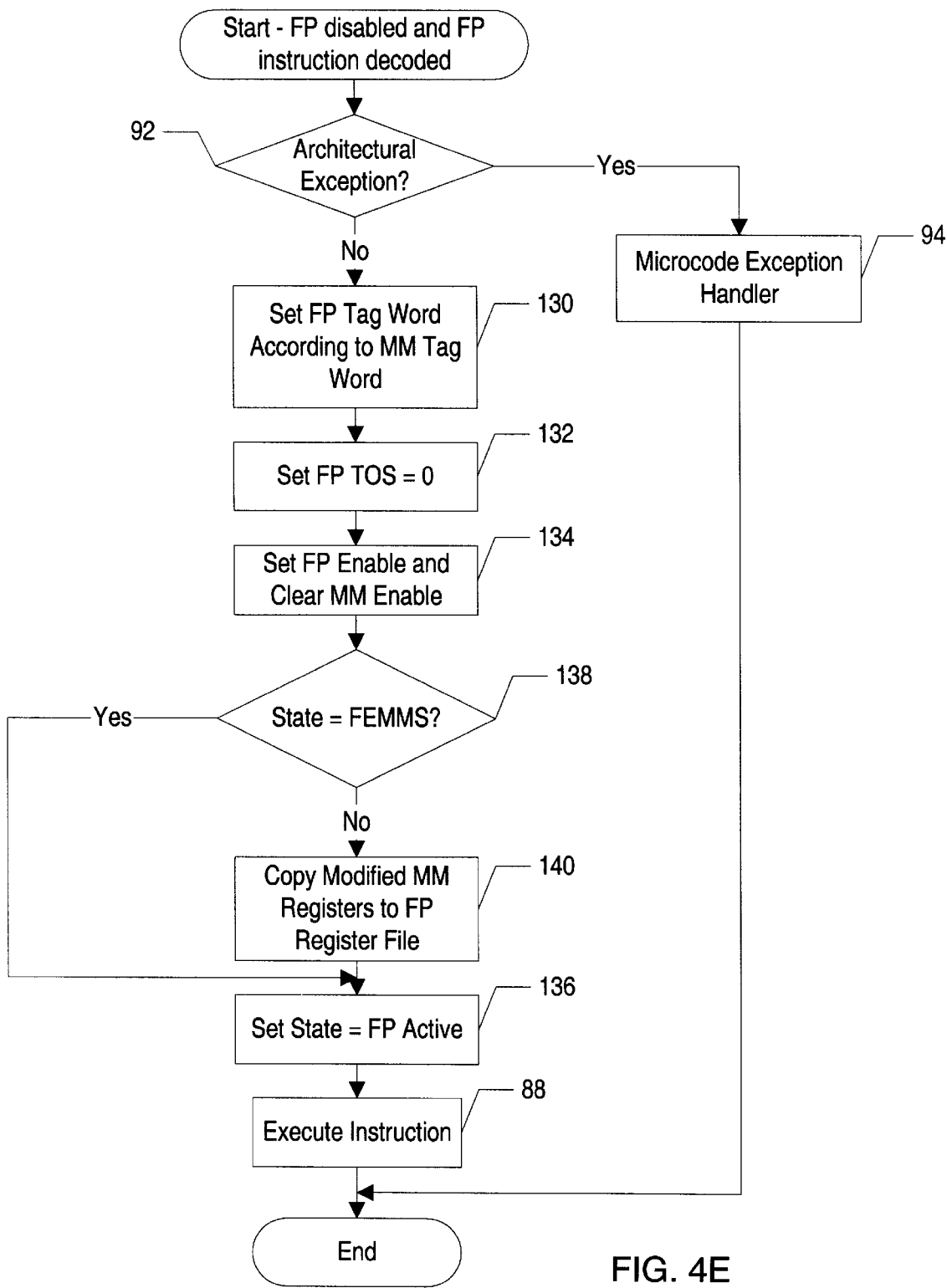
FIG. 4E is a flowchart illustrating steps performed in a microcode sequence upon detecting a floating point instruction with floating point instructions disabled.

Turning now to FIG. 4E, a flowchart is shown illustrating the microcode routine executed upon decoding a floating point instruction while the floating point enable indication indicates disabled. Similar to the routines shown in FIGS. 4C and 4D, the microcode routine determines if an architectural exception is to be taken in response to the instruction (decision block 92) and the microcode routine passes control to a microcode exception handler (step 94) if an architectural exception is to be taken.

If no architectural exception is to be taken, the microcode routine updates the floating point tag word to one of two values based upon the multimedia tag word. Multimedia instructions other than the EMMS instruction are defined to update the tag word to an "all valid" encoding (all zeros). The EMMS instruction and the FEMMS instruction are defined to update the tag word to an "all empty" encoding (all ones). Accordingly, microprocessor 10 tracks whether the tag word is either all valid or all empty during execution of multimedia instructions. The microcode routine updates the floating point tag word according to the tracked multimedia tag word value (step 130). Additionally, multimedia instructions and the FEMMS instruction are defined to set the floating point top of stack (TOS) field in the floating point status register to zero. The microcode routine accordingly updates the floating point TOS field to zero (step 132). It is noted that, in one embodiment, step 132 is performed when switching from floating point enabled to multimedia enabled (e.g. within the microcode routines illustrated in FIGS. 4C and 4D). Step 132 may be performed in the microcode routines illustrated in FIGS. 4C and 4D because the TOS field is always set to zero upon return from executing multimedia instructions and is a don't care for multimedia instructions.

The microcode routine additionally sets the floating point enable indication to indicate enabled and the multimedia enable indication to indicate disabled (step 134).

The microcode routine determines if a register file synchronization is to be performed by examining the current floating point/multimedia state (decision block 138). If the current state is FEMMS, then a register file synchronization is not to be performed. Accordingly, the floating point/ multimedia state is updated to the FP active state (step 136), and the floating point instruction is executed (step 88). On the other hand, if the current state is not FEMMS (i.e. it is multimedia active), then a register file synchronization is performed prior to executing the floating point instruction.

In the present embodiment, register file 44 implements 64 bit registers for the multimedia registers. Register file 42, on the other hand, implements 80 bit registers to handle the extended floating point data type. The 64 bits of the multimedia register are defined to be stored in the significand portion of the floating point register, with the exponent and sign fields set to all ones. However, if a particular multimedia register is not modified by a multimedia instruction sequence, the previous 80 bit value is defined to be stored in the corresponding floating point register upon execution of a subsequent floating point instruction.

Accordingly, microprocessor 10 is configured to track which of the multimedia registers have been updated. For example, a dirty bit corresponding to each multimedia register may be implemented. If the dirty bit is set, the corresponding multimedia register has been modified. If the dirty bit is clear, the corresponding multimedia register has not been modified. When a register file synchronization from register file 44 (the multimedia registers) to register file 42 (the floating point registers) is to be performed, the microcode routine selectively copies the values from the multimedia registers which have been modified to the corresponding floating point register (i.e. the multimedia registers which have not been modified are not copied) (step 140). In an alternative embodiment, 80 bit multimedia registers may be implemented within register file 44 and all register values may be copied.

It is noted that, in the present embodiment, execution of the FEMMS instruction clears the dirty bits corresponding to the multimedia registers. Accordingly, the floating point/ multimedia state may be implemented by storing a floating point active/floating point not active value in scratch RAM 68 and inferring the FEMMS and multimedia active states. The FEMMS state may be inferred from the combination of the floating point not active state and the dirty bits being clear, while the multimedia active state may be inferred from the combination of the floating point not active state and one or more of the dirty bits being set.

It is noted that, while the above description provides for multiple microcode routines for handling the various boundary conditions, a single microcode routine may be implemented. The single microcode routine may check any combination of floating point/multimedia state, enable indications, and/or instruction types to determine whether or not register file synchronization is to be performed, which direction a synchronization should be performed, etc.

Figure 5:
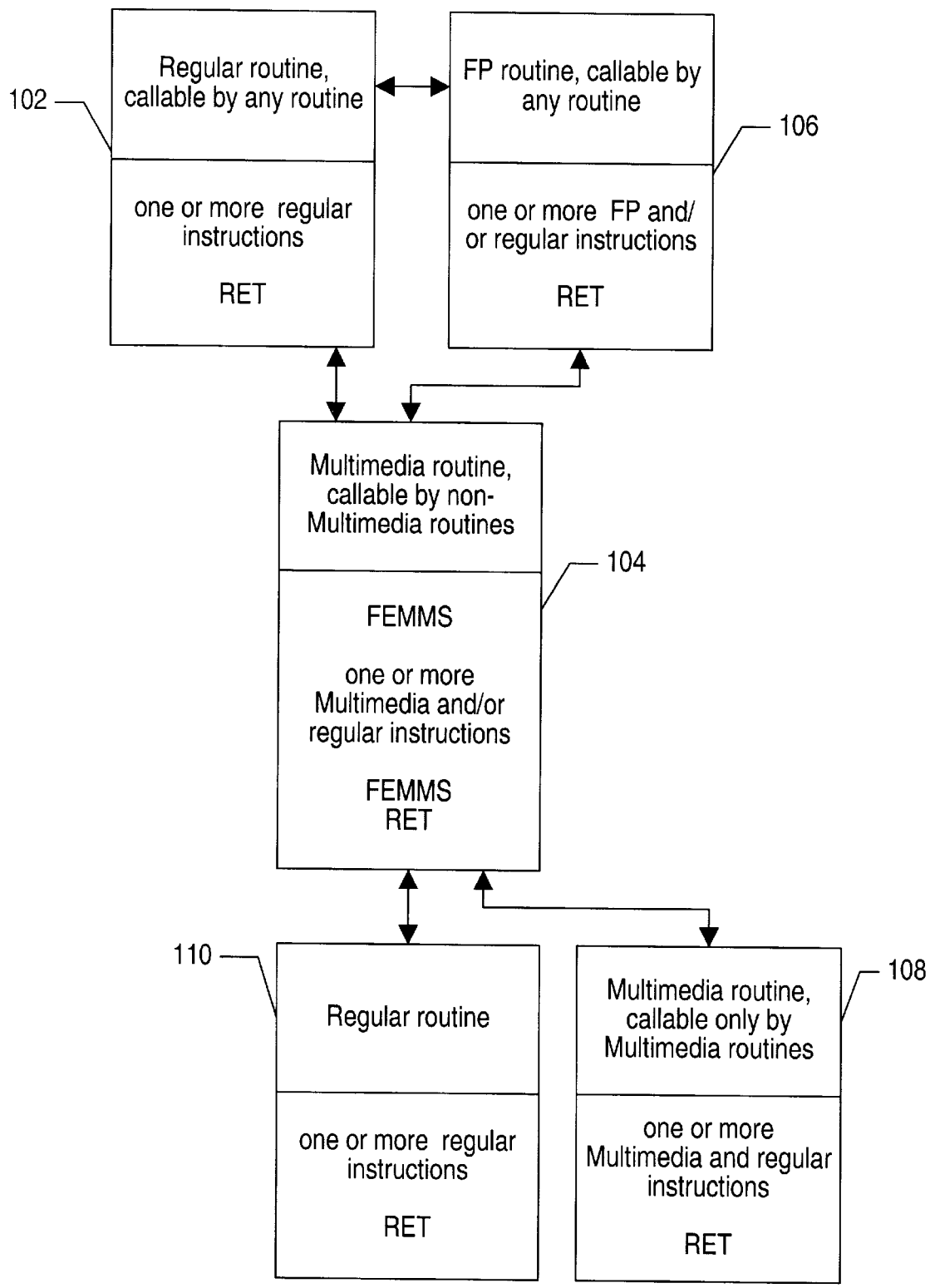
FIG. 5 is a diagram illustrating a subroutine hierarchy and exemplary use of the fast empty state instruction.

Turning now to FIG. 5, an exemplary software hierarchy is shown to indicate exemplary uses for the FEMMS instruction. A variety of routines are illustrated via boxes 102–108. Each box is divided into an upper portion and a lower portion. The upper portion identifies the type of routine, and the lower portion illustrates the set of instructions included in that type of routine. Arrows between the boxes illustrate which routines may communicate with each other (i.e. call or be called).

The routine illustrated by box 102 is a regular routine which may be called by any routine, including floating point routines. Accordingly, the routine includes one or more regular instructions concluded with a return instruction.

A floating point routine is illustrated by box 106. Floating point routines may be called by any other routines, and include one or more floating point and/or regular instructions and conclude with a return instruction.

Box 104 illustrates a multimedia routine which is callable by non multimedia routines including, for example, floating point routines. Accordingly, the routine is initiated by an FEMMS instruction to inhibit a register file synchronization if the routine is called by a floating routine or is called subsequent to the execution of a floating point routine but prior to the execution of a different multimedia routine. The FEMMS instruction is followed by one or more multimedia and/or regular instructions. The routine concludes with another FEMMS instruction and a return instruction. The concluding FEMMS instruction inhibits a register file synchronization if a subsequent routine executes floating point instructions.

The routine illustrated by box 108 is a multimedia routine (i.e. a routine including one or more multimedia instructions and optionally one or more regular instructions) which is called only by multimedia routines. Since the routine illustrated by box 108 is only called by multimedia routines, the routine illustrated by box 108 may omit the FEMMS instruction and rely on the called routines to insert the FEMMS instruction prior to execution of any floating point instructions. The routine illustrated by box 108 concludes with a return instruction.

The routine illustrated by box 110 is a regular routine called by multimedia routine 104. Box 110 illustrates that routine 104 may call regular routines without special consideration, if desired.

The routines illustrated in FIG. 5 are an exemplary attempt to minimize the number of FEMMS instructions which are included in the variety of routines which may be employed by a program. Additionally, it is noted that if register file synchronizations are desired, then the FEMMS instruction should not be used for those routines.

It is noted that, while the present disclosure has focused in some portions on multimedia registers and floating point registers which are logically mapped to the same storage locations, the present disclosure may be applied to any set of data types or data formats which are defined to share the same logical (or architected) storage.

Figure 6:
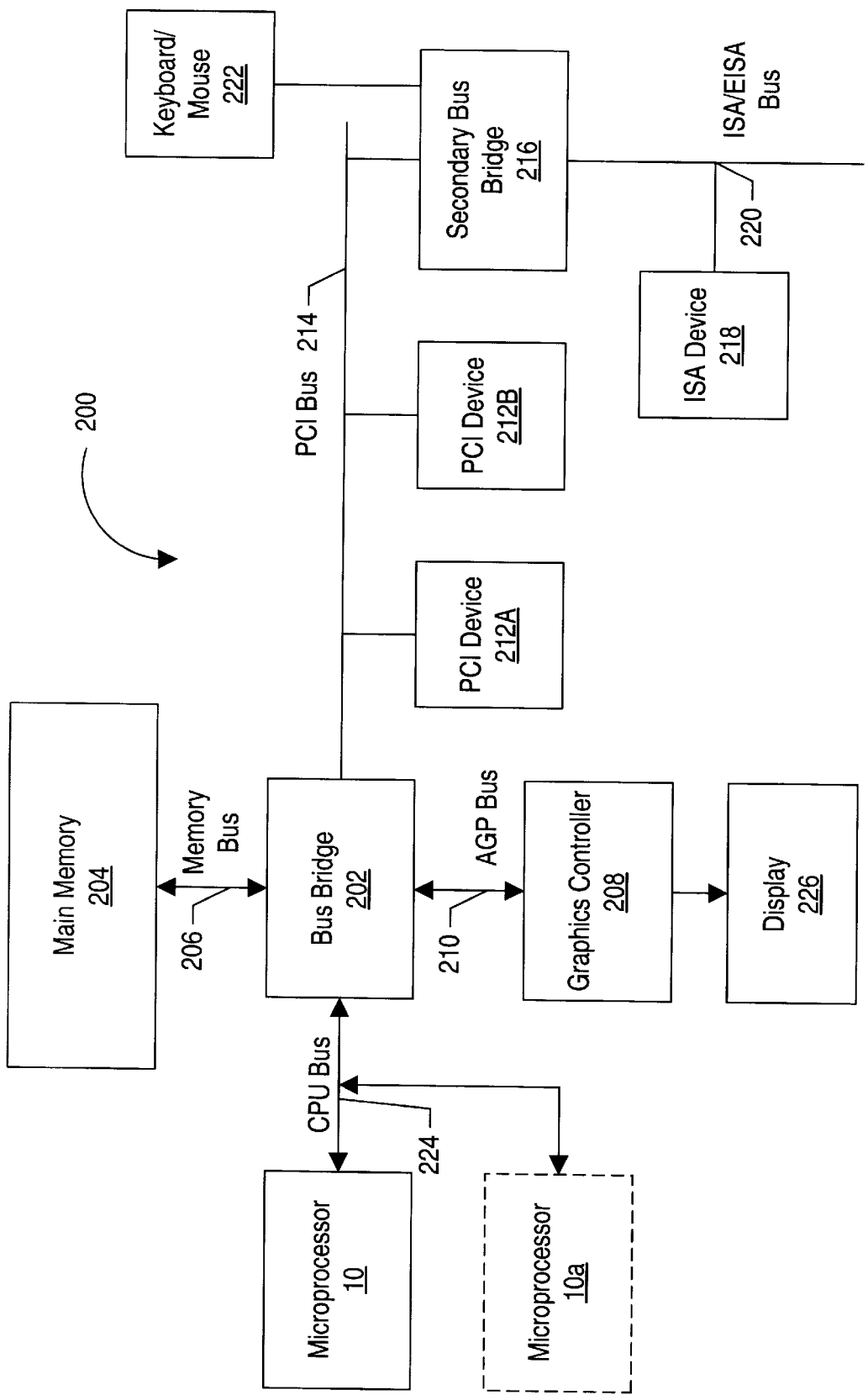
FIG. 6 is a block diagram of one embodiment of a computer system including the microprocessor shown in FIG. 1.

Turning now to FIG. 6, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 6) or may be connected to bus bridge 202 via an independent bus.

In accordance with the above disclosure, a microprocessor has been shown which supports selective register file synchronization between two register files which are defined to map to the same logical storage. Advantageously, if synchronization between the register files is not desired, the microprocessor may inhibit the synchronization. Instruction sequences employing both types of instructions which access the same logical register file and which do not require register file synchronization may achieve higher performance due to the non-synchronization of the register files. On the other hand, code sequences which do require register file synchronization still receive the benefits of the synchronization (with possibly lower performance achieved).

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a decode unit configured to decode instructions defined within an instruction set including a first type of instructions, a second type of instructions, and an empty state instruction, wherein said instruction set further defines that a first plurality of registers accessible via said first type of instructions and a second plurality of registers accessible via said second type of instructions are mapped onto a logical storage in which each of said first plurality of registers is assigned to a logical storage location to which a corresponding one of said second plurality of registers is assigned;
   a first register file including physical storage locations corresponding to said first plurality of registers;
   a second register file including physical storage locations corresponding to said second plurality of registers;
   a first execution unit coupled to said first register file, wherein said first execution unit is configured to execute instructions of said first type, and wherein said first execution unit is configured to read operands for said instructions of said first type from said first register file; and
   a second execution unit coupled to said second register file, wherein said second execution unit is configured to execute instructions of said second type, and wherein said second execution unit is configured to read operands for said instructions of said second type from said second register file;
   wherein said microprocessor is configured to inhibit a synchronization of said first register file and said second register file between an execution of said first instruction and an execution of said second instruction responsive to executing a first instruction sequence including a first instruction of said first type, said empty state instruction, and said second instruction of said second type.

2. The microprocessor as recited in claim 1 wherein said first type of instructions comprises multimedia instructions.

3. The microprocessor as recited in claim 2 wherein said second type of instructions comprises floating point instructions.

4. The microprocessor as recited in claim 1 wherein said first type of instructions comprises floating point instructions.

5. The microprocessor as recited in claim 4 wherein said second type of instructions comprises multimedia instructions.

6. The microprocessor as recited in claim 1 wherein said microprocessor is configured to inhibit said synchronization only responsive to a program order of said first instruction sequence being said first instruction, subsequently said empty state instruction, and further subsequently said second instruction.

7. The microprocessor as recited in claim 6 wherein said first instruction sequence further includes one or more instructions of a third type of instructions defined by said instruction set.

8. The microprocessor as recited in claim 7 wherein said microprocessor is configured to inhibit said synchronization even if some of said one or more instructions are between said first instruction and said empty state instruction in program order.

9. The microprocessor as recited in claim 7 wherein said microprocessor is configured to inhibit said synchronization even if some of said one or more instructions are between said second instruction and said empty state instruction in program order.

10. The microprocessor as recited in claim 7 wherein said third type of instructions comprises integer instructions.

11. The microprocessor as recited in claim 1 wherein said first instruction sequence further includes one or more instructions of a third type of instructions defined by said instruction set.

12. The microprocessor as recited in claim 11 wherein said microprocessor is configured to inhibit said synchronization even if some of said one or more instructions are between said first instruction and said empty state instruction in program order.

13. The microprocessor as recited in claim 11 wherein said microprocessor is configured to inhibit said synchronization even if some of said one or more instructions are between said second instruction and said empty state instruction in program order.

14. The microprocessor as recited in claim 11 wherein said third type of instructions comprises integer instructions.

15. The microprocessor as recited in claim 1 wherein said microprocessor is configured to perform said synchronization of said first register file and second register file upon decode of a second instruction sequence including said first and second instructions but excluding said empty state instruction.

16. The microprocessor as recited in claim 15 wherein said decode unit comprises:
one or more decoders configured to decode instructions; and
a microcode ROM coupled to provide instructions upon decode of a microcoded instruction by one of said one or more decoders, said microcode ROM further storing a routine including instructions to inhibit said synchronization and instructions to perform said synchronization.

17. A method for executing instructions defined within an instruction set including a first type of instructions, a second type of instructions, and an empty state instruction, wherein said instruction set further defines that a first plurality of registers accessible via said first type of instructions and a second plurality of registers accessible via said second type of instructions are mapped onto a logical storage in which each of said first plurality of registers is assigned to a logical storage location to which a corresponding one of said second plurality of registers is assigned, the method comprising:
reading a first operand for a first instruction of said first type from a first register file including physical storage locations for each of said first plurality of registers;
reading a second operand for a second instruction of said second type from a second register file including physical storage locations for each of said second plurality of registers;
synchronizing said first register file and said second register file between said reading said first operand and said reading said second operand responsive to executing an instruction sequence not including said empty state instruction between said first instruction and said second instruction; and
inhibiting a synchronization of said first register file and said second register file responsive to executing said instruction sequence including said empty state instruction between said first instruction and said second instruction.

18. The method as recited in claim 17 wherein said reading said first operand comprises reading said first operand for said first instruction of a multimedia type from said first register file.

19. The method as recited in claim 18 wherein said reading said second operand comprises reading said second operand for said second instruction of a floating point type from said second register file.

20. The method as recited in claim 17 wherein a program order of said instruction sequence includes said first instruction, subsequently said empty state instruction, and further subsequently said second instruction.

21. The method as recited in claim 20 further comprising synchronizing said first register file and said second register file responsive to said instruction sequence including a third instruction of said first type between said empty state instruction and said second instruction.

22. The method as recited in claim 17 wherein said inhibiting is performed even if one or more instructions of a third type of instructions defined within said instruction set are included within said instruction sequence between said first instruction and said empty state instruction or between said second instruction and said empty state instruction.

23. The method as recited in claim 17 wherein said synchronizing is performed even if one or more instructions of a third type of instructions defined within said instruction set are included within said instruction sequence between said first instruction and said second instruction, provided that said empty state instruction is excluded from said instruction sequence.

24. A microprocessor comprising:
a first register file including physical storage locations corresponding to a first plurality of registers; and
a second register file including physical storage locations corresponding to a second plurality of registers;
wherein said microprocessor is configured to execute instructions defined within an instruction set including a first type of instructions, a second type of instructions, and an empty state instruction, and wherein said instruction set further defines that said first plurality of registers are accessible via said first type of instructions and said second plurality of registers are accessible via said second type of instructions, and wherein said instruction set still further defines that said first plurality of registers and said second plurality of registers are mapped onto a logical storage in which each of said first plurality of registers is assigned to a logical storage location to which a corresponding one of said second plurality of registers is assigned, and wherein said microprocessor is configured to inhibit a synchronization of said first register file and said second register file subsequent to executing a first instruction of said first type and prior to executing a second instruction of said second type responsive to executing a first instruction sequence including said first instruction and said second instruction and also including said empty state instruction.

25. The microprocessor as recited in claim 24 wherein said first type of instructions comprises multimedia instructions.

26. The microprocessor as recited in claim 25 wherein said second type of instructions comprises floating point instructions.

27. The microprocessor as recited in claim 24 wherein said first type of instructions comprises floating point instructions.

28. The microprocessor as recited in claim 27 wherein said second type of instructions comprises multimedia instructions.

29. The microprocessor as recited in claim 24 wherein said microprocessor is configured to inhibit said synchronization only responsive to a program order of said first instruction sequence being said first instruction, subsequently said empty state instruction, and further subsequently said second instruction.

30. The microprocessor as recited in claim 29 wherein said first instruction sequence further includes one or more instructions of a third type of instructions defined by said instruction set.

31. The microprocessor as recited in claim 30 wherein said microprocessor is configured to inhibit said synchronization even if some of said one or more instructions are between said first instruction and said empty state instruction in program order.

32. The microprocessor as recited in claim 30 wherein said microprocessor is configured to inhibit said synchronization even if some of said one or more instructions are between said second instruction and said empty state instruction in program order.

33. The microprocessor as recited in claim 30 wherein said third type of instructions comprises integer instructions.

34. The microprocessor as recited in claim 24 wherein said microprocessor is configured to perform said synchronization of said first register file and second register file subsequent to executing said first instruction and prior to executing said second instruction responsive to a second instruction sequence including said first and second instructions but excluding said empty state instruction.

35. A computer system, comprising:
a microprocessor including a first register file including physical storage locations corresponding to a first plurality of registers and a second register file including physical storage locations corresponding to a second plurality of registers, wherein said microprocessor is configured to execute instructions defined within an instruction set including a first type of instructions, a second type of instructions, and an empty state instruction, and wherein said instruction set further defines that said first plurality of registers are accessible via said first type of instructions and said second plurality of registers are accessible via said second type of instructions, and wherein said instruction set still further defines that said first plurality of registers and said second plurality of registers are mapped onto a logical storage in which each of said first plurality of registers is assigned to a logical storage location to which a corresponding one of said second plurality of registers is assigned, and wherein said microprocessor is configured to inhibit a synchronization of said first register file and said second register file subsequent to executing a first instruction of said first type and prior to executing a second instruction of said second type responsive to executing an instruction sequence including said first instruction and said second instruction and also including said empty state instruction;
a main memory coupled to said microprocessor, wherein said main memory is configured to store said instruction sequence and to provide said instruction sequence to said microprocessor upon request therefrom for said instruction sequence; and
an input/output (I/O) device coupled to said main memory, said I/O device configured to transfer data between said main memory and a second computer system coupled to said I/O device.

36. The computer system as recited in claim 35 further comprising a second microprocessor identical to said microprocessor.

37. The computer system as recited in claim 35 further comprising a second microprocessor including a third register file including physical storage locations corresponding to said first plurality of registers and a fourth register file including physical storage locations corresponding to said second plurality of registers, wherein said second microprocessor is configured to execute instructions defined within said instruction set including said first type of instructions, said second type of instructions, and said empty state instruction, and wherein said second microprocessor is configured to inhibit said synchronization of said third register file and said fourth register file subsequent to executing said first instruction of said first type and prior to executing said second instruction of said second type responsive to executing said instruction sequence including said first instruction and said second instruction and also including said empty state instruction.

38. A microprocessor comprising:
a first register file including physical storage locations corresponding to a first plurality of registers; and
a second register file including physical storage locations corresponding to a second plurality of registers;
wherein said microprocessor is configured to execute instructions defined within an instruction set including a first type of instructions, a second type of instructions, and a third instruction, and wherein said instruction set further defines that said first plurality of registers are accessible via said first type of instructions and said second plurality of registers are accessible via said second type of instructions, and wherein said instruction set still further defines that said first plurality of registers and said second plurality of registers are mapped onto a logical storage in which each of said first plurality of registers is assigned to a logical storage location to which a corresponding one of said second plurality of registers is assigned, and wherein said microprocessor is configured to selectively synchronize said first register file and said second register file during execution of a first instruction sequence including said first instruction and said second instruction responsive to a presence or an absence of said third instruction in said first instruction sequence.

39. The microprocessor as recited in claim 38 wherein said microprocessor is configured to synchronize said first register file and said second register file responsive to said absence of said third instruction, and wherein said microprocessor is configured to inhibit synchronization of said first register file and said second register file responsive to said presence of said third instruction.

40. The microprocessor as recited in claim 38 wherein said first type of instructions comprises multimedia instructions.

41. The microprocessor as recited in claim 40 wherein said second type of instructions comprises floating point instructions.

42. The microprocessor as recited in claim 38 wherein said first type of instructions comprises floating point instructions.

43. The microprocessor as recited in claim 42 wherein said second type of instructions comprises multimedia instructions.

44. The microprocessor as recited in claim 38 wherein said microprocessor is configured to inhibit synchronization only responsive to a program order of said first instruction sequence being said first instruction, subsequently said third instruction, and further subsequently said second instruction.

45. The microprocessor as recited in claim 44 wherein said first instruction sequence further includes one or more instructions of a third type of instructions defined by said instruction set.

46. The microprocessor as recited in claim 45 wherein said microprocessor is configured to inhibit said synchronization even if some of said one or more instructions are between said first instruction and said third instruction in program order.

47. The microprocessor as recited in claim 45 wherein said microprocessor is configured to inhibit said synchronization even if some of said one or more instructions are between said second instruction and said third instruction in program order.

48. The microprocessor as recited in claim 45 wherein said third type of instructions comprises integer instructions.

49. A method for executing instructions defined within an instruction set including a first type of instructions, a second type of instructions, and a third instruction, wherein said instruction set further defines that a first plurality of registers accessible via said first type of instructions and a second plurality of registers accessible via said second type of instructions are mapped onto a logical storage in which each of said first plurality of registers is assigned to a logical storage location to which a corresponding one of said second plurality of registers is assigned, the method comprising:

reading a first operand for a first instruction of said first type from a first register file including physical storage locations for each of said first plurality of registers;

reading a second operand for a second instruction of said second type from a second register file including physical storage locations for each of said second plurality of registers; and selectively synchronizing said first register file and said second register file between said reading said first operand and said reading said second operand responsive to a presence or absence of said third instruction within an instruction sequence including said first instruction and said second instruction.

50. The method as recited in claim 49 wherein said reading said first operand comprises reading said first operand for said first instruction of a multimedia type from said first register file.

51. The method as recited in claim 50 wherein said reading said second operand comprises reading said second operand for said second instruction of a floating point type from said second register file.

52. The method as recited in claim 49 wherein a program order of said instruction sequence includes said first instruction, subsequently said third instruction, and further subsequently said second instruction.

53. The method as recited in claim 49 wherein said selectively synchronizing is performed even if one or more instructions of a third type of instructions defined within said instruction set are included within said instruction sequence between said first instruction and said third instruction or between said second instruction and said third instruction.

54. The method as recited in claim 49 wherein said selectively synchronizing comprises:

synchronizing said first register file and said second register file responsive to said absence of said third instruction; and inhibiting synchronization of said first register file and said second register file responsive to said presence of said third instruction.

55. A computer system comprising:

a microprocessor including a first register file including physical storage locations corresponding to a first plurality of registers and a second register file including physical storage locations corresponding to a second plurality of registers, wherein said microprocessor is configured to execute instructions defined within an instruction set including a first type of instructions, a second type of instructions, and a third instruction, and wherein said instruction set further defines that said first plurality of registers are accessible via said first type of instructions and said second plurality of registers are accessible via said second type of instructions, and wherein said instruction set still further defines that said first plurality of registers and said second plurality of registers are mapped onto a logical storage in which each of said first plurality of registers is assigned to a logical storage location to which a corresponding one of said second plurality of registers is assigned, and wherein said microprocessor is configured to selectively synchronize said first register file and said second register file during execution of a first instruction sequence including said first instruction and said second instruction responsive to a presence or an absence of said third instruction in said first instruction sequence; and an input/output (I/O) device coupled to said main memory, said I/O device configured to transfer data between said main memory and a second computer system coupled to said I/O device.

56. The computer system as recited in claim 55 further comprising a second microprocessor including a third register file including physical storage locations corresponding to said first plurality of registers and a fourth register file including physical storage locations corresponding to said second plurality of registers, wherein said second microprocessor is configured to execute instructions defined within said instruction set including said first type of instructions, said second type of instructions, and said third instruction, and wherein said second microprocessor is configured to selectively synchronize said third register file and said fourth register file during execution of said first instruction sequence including said first instruction and said second instruction responsive to said presence or said absence of said third instruction in said first instruction sequence.

* * * * *